(12) United States Patent
Liu et al.

(10) Patent No.: US 12,341,347 B2
(45) Date of Patent: Jun. 24, 2025

(54) ELECTRICAL SYSTEM AND SUPPORTING DEVICE THEREOF

(71) Applicant: Delta Electronics (Shanghai) Co., Ltd., Shanghai (CN)

(72) Inventors: Teng Liu, Shanghai (CN); Jianxing Dong, Shanghai (CN); Xiaohu Li, Shanghai (CN); Ming Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 35 days.

(21) Appl. No.: 18/385,289

(22) Filed: Oct. 30, 2023

(65) Prior Publication Data

US 2024/0170972 A1    May 23, 2024

(30) Foreign Application Priority Data

Nov. 21, 2022   (CN) .......................... 202211456672.4

(51) Int. Cl.
*H02J 3/38*    (2006.01)
*H02J 3/32*    (2006.01)

(52) U.S. Cl.
CPC .............. *H02J 3/381* (2013.01); *H02J 3/32* (2013.01); *H02J 2300/28* (2020.01)

(58) Field of Classification Search
CPC .......... H02J 3/32; H02J 3/381; H02J 2300/20; H02J 2300/28

USPC ........................................................... 307/43
See application file for complete search history.

(56) References Cited

U.S. PATENT DOCUMENTS

| | | |
|---|---|---|
| 2016/0013653 A1 | 1/2016 | Dorn et al. |
| 2017/0279161 A1 | 9/2017 | Kamikawa et al. |
| 2022/0269325 A1 | 8/2022 | Huang et al. |
| 2022/0320894 A1 | 10/2022 | Bede et al. |

FOREIGN PATENT DOCUMENTS

| | | |
|---|---|---|
| CN | 102868154 A | 1/2013 |
| CN | 102257578 B | 12/2014 |
| CN | 207743704 U | 8/2018 |
| SE | 515953 C2 | 11/2001 |

*Primary Examiner* — Hal Kaplan
(74) *Attorney, Agent, or Firm* — KIRTON McCONKIE; Evan R. Witt

(57) ABSTRACT

An electrical system includes a first conduction terminal, a second conduction terminal, N power units and N supporting devices. The N power units are electrically connected between the first conduction terminal and the second conduction terminal in series, and N is an integer greater than or equal to 2. Each of the N supporting devices includes a conductive part and a support part. Each of the N power units is disposed on the corresponding conductive part. The conductive part is electrically connected with a power terminal of one of the N power units or electrically connected with a reference potential of the electrical system. The support part is connected between the corresponding conductive part and a ground potential.

20 Claims, 28 Drawing Sheets

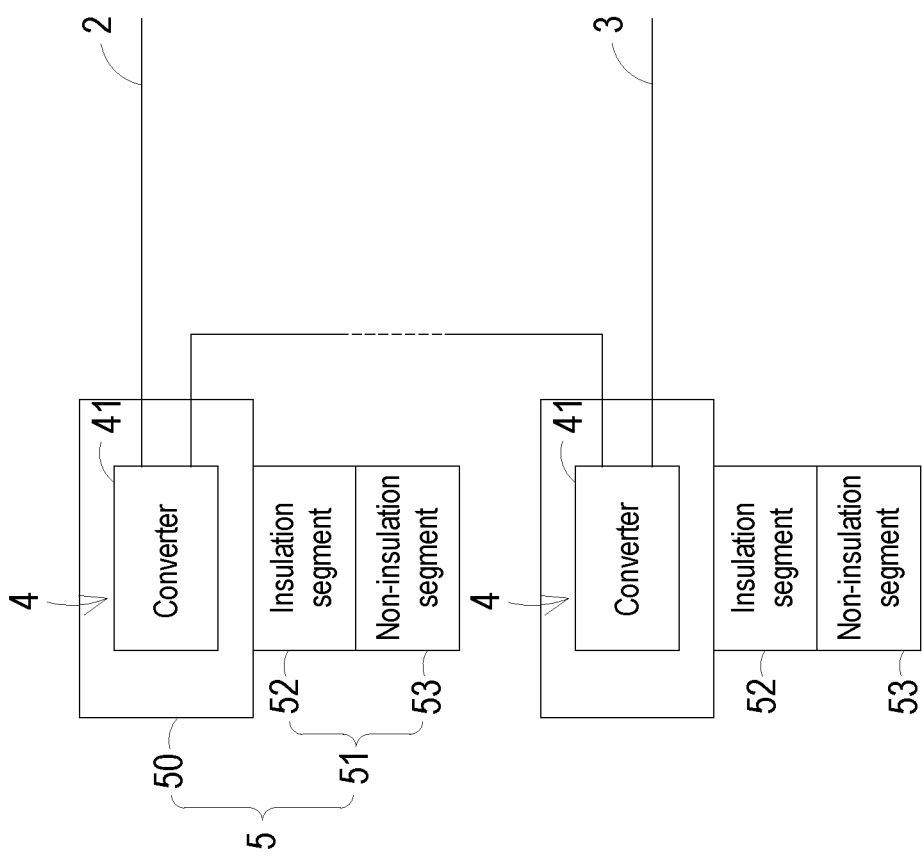

ELECTRICAL SYSTEM AND SUPPORTING DEVICE THEREOF

CROSS-REFERENCE TO RELATED APPLICATION

This application claims priority to China Patent Application No. 202211456672.4, filed on Nov. 21, 2022, the entire content of which is incorporated herein by reference for all purposes.

FIELD OF THE INVENTION

The present disclosure relates to an insulation structure of an electrical system, and more particularly to an electrical system with a supporting device to solve the insulation stress problem caused by high voltage.

BACKGROUND OF THE INVENTION

With the rapid development of global industrialization, the demands on energy source and environmental protection are increasing. In recent years, the scales of new energy industries have obtained the sustained and rapid growth. However, the new energy power stations are usually far away from the end user areas. Consequently, it is important to develop a method for transmitting the generated electric energy in a simply and efficient manner.

Generally, for implementing the large-capacity and long-distance power transmission, the electrical system requires the high transmission voltage to reduce the power loss of the transmission line. In the power generation side, it is necessary to increase the voltage to the transmission voltage through several step-up links. In the user side, the transmission voltage is decreased to the working voltage to be used by the end user through several step-down links. Consequently, if the number of the step-up links or the number of the step-down links is reduced, the power loss will be reduced, and the utilization of the electric energy can be enhanced.

FIG. 1 schematically illustrates the architecture of a first type conventional electrical system. For example, the first type conventional electrical system 10a is a wind power generation system or a photovoltaic power generation system. The first type conventional electrical system 10a uses a parallel-connection power supply mechanism. That is, the voltage of each power unit of the electrical system 10a is increased to a suitable system voltage level through several boost transformers, then transmitted to a power collection system 10c, and finally transmitted to a power grid 10d. However, since the power generation system with the parallel-connection power supply mechanism needs many step-up links, the utilization efficiency of electric power is reduced. Moreover, due to the installation of the boost transformers, the construction investment cost of the electrical system 10a is increased.

FIG. 2 schematically illustrates the architecture of a second type conventional electrical system. In the second type conventional electrical system 10b, the power sources at the power generation side of the electrical system 10b are connected with each other in series. For example, the power units of the second type conventional electrical system 10b are connected with each other in series. Alternatively, the loads of the user sides are connected with each other in series and then connected with the power grid 10d. Since the number of the power transformation links is decreased, the energy utilization is enhanced, and the investment cost of the power system equipment is reduced.

However, the serial connection of the power sources or the loads results in high insulation stress. Due to the high insulation stress, the power equipment at the source side or the load side is bulky, expensive, and difficult to be fabricated. Consequently, the series-connected electrical system has some technical problems. For example, the casing of the conventional wind power generation system is connected with the ground terminal. Like the high-voltage DC transmission line, the power unit on the top of wind power generation system has to withstand the same voltage to earth. Under this circumstance, the insulation design about the wind wheel bearing seat and the wind power generator is difficult. Consequently, the efficacy of increasing the voltage through the serial connection mechanism is limited.

In case that the high frequency transformers with electrical isolation are used, the insulation problems of the wind wheel bearing seats and wind power generators will be transferred to the high frequency transformers. However, the uses of the high frequency transformers and their insulation structures may increase the investment cost. In addition, the uses of the high frequency transformers and their insulation structures limit the promotions and the applications of the serial connection mechanism.

Furthermore, the energy storage system or the data center system is developed towards the medium voltage level or the high voltage level. For achieving this purpose, a plurality of servers are serially connected with each other to increase the voltage. Consequently, the deterioration of the boost transformers can be avoided. In addition, the efficiency of medium and high-voltage energy storage system (or the data center system) is at least 1.5% higher than that of low-voltage energy storage system (or data center system).

However, in the energy storage system (or data center system), if the plurality of servers are serially connected with each other to increase the voltage, the high-voltage DC transmission may result in very large insulation stress between servers and between servers and the ground. According to safety regulations, a longer distance between electrical components (e.g., battery packs) and the ground (e.g., containers) is required. Consequently, the overall volume of the energy storage system (or the data center system) is large, and the power density is low.

Therefore, there is a need of providing an electrical system with an improved insulation structure in order to overcome the drawbacks of the conventional technologies.

SUMMARY OF THE INVENTION

The present disclosure provides an electrical system and a supporting device of the electrical system. The power units of the electrical system are electrically connected with each other in series. A conductive part of the supporting device is electrically connected with the power terminal of the power unit, or electrically connected with a reference potential of the electrical system. A support part of the supporting device is connected between the conductive part and the ground potential. Due to the special design, the electrical system has enhanced power transmission efficiency, reduced installation cost, reduced insulation requirement and increased voltage level.

In accordance with an aspect of the present disclosure, an electrical system is provided. The electrical system includes a first conduction terminal, a second conduction terminal, N power units and N supporting devices. The N power units are electrically connected between the first conduction terminal and the second conduction terminal in series, and N is an integer greater than or equal to 2. Each of the N supporting devices includes a conductive part and a support part. Each of the N power units is disposed on the corresponding conductive part. The conductive part is electrically connected with a power terminal of one of the N power units or electrically connected with a reference potential of the electrical system. The support part is connected between the corresponding conductive part and a ground potential.

In accordance with another aspect of the present disclosure, an electrical system is provided. The electrical system includes a first conduction terminal, a second conduction terminal, a power unit and a supporting device. The power unit is electrically connected between the first conduction terminal and the second conduction terminal. The supporting device includes a conductive part and a support part. The power unit is disposed on the conductive part. The conductive part is electrically connected with a power terminal of the power unit or electrically connected with a reference potential of the electrical system. The support part is connected between the conductive part and a ground potential.

In accordance with another aspect of the present disclosure, a supporting device for an electrical system is provided. The electrical system includes a first conduction terminal, a second conduction terminal and at least one power unit. The at least one power unit is electrically connected between the first conduction terminal and the second conduction terminal. The supporting device includes a conductive part and a support part. One of the at least one power unit is disposed on the conductive part. The conductive part is electrically connected with a power terminal of one of the at least one power unit or electrically connected with a reference potential of the electrical system. The support part is connected between the conductive part and a ground potential.

The above contents of the present disclosure will become more readily apparent to those ordinarily skilled in the art after reviewing the following detailed description and accompanying drawings, in which:

BRIEF DESCRIPTION OF THE DRAWINGS

FIG. 3B is a schematic functional block diagram illustrating some components of the electrical system as shown in FIG. 3A;

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present disclosure provides an electrical system. The electrical system is a wind power generation system, an energy storage system, or a data center system. Some embodiments will be illustrated in more details. In the following embodiments, component parts and elements with similar structures and functions are designated by identical numeral references, and detailed descriptions thereof are omitted.

Figure 1:
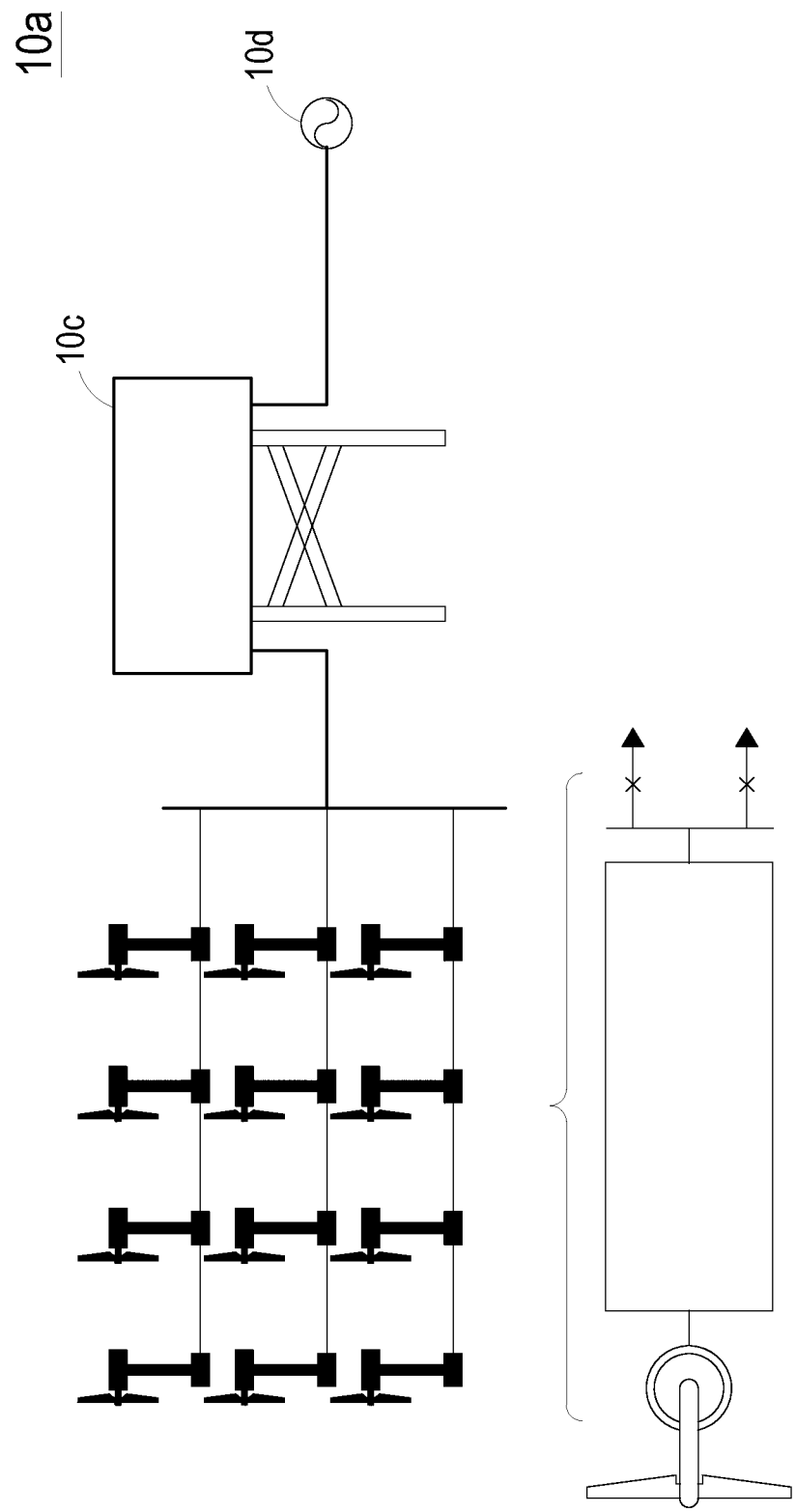
FIG. 1 schematically illustrates the architecture of a first type conventional electrical system.
Figure 2:
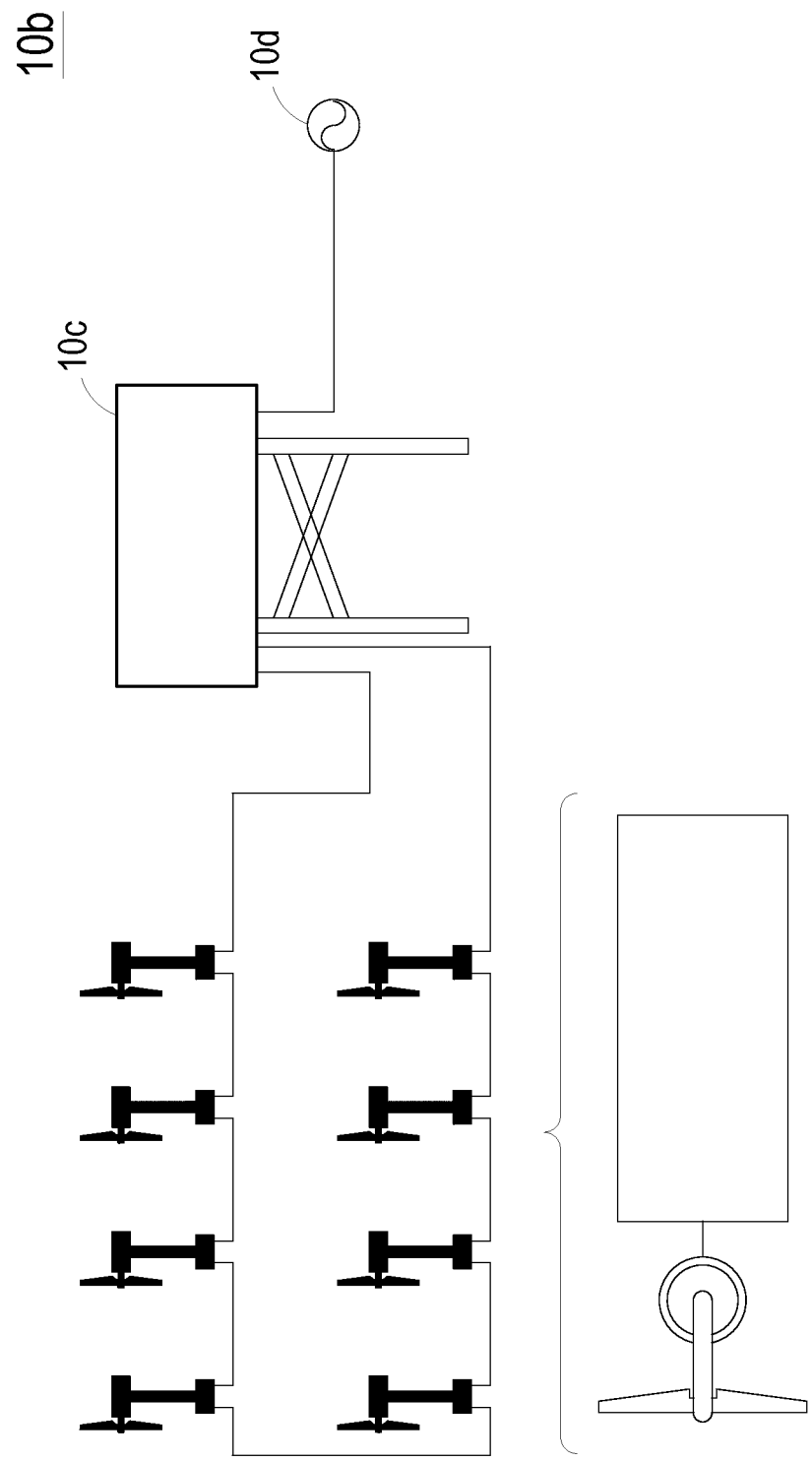
FIG. 2 schematically illustrates the architecture of a second type conventional electrical system.
Figure 3A:
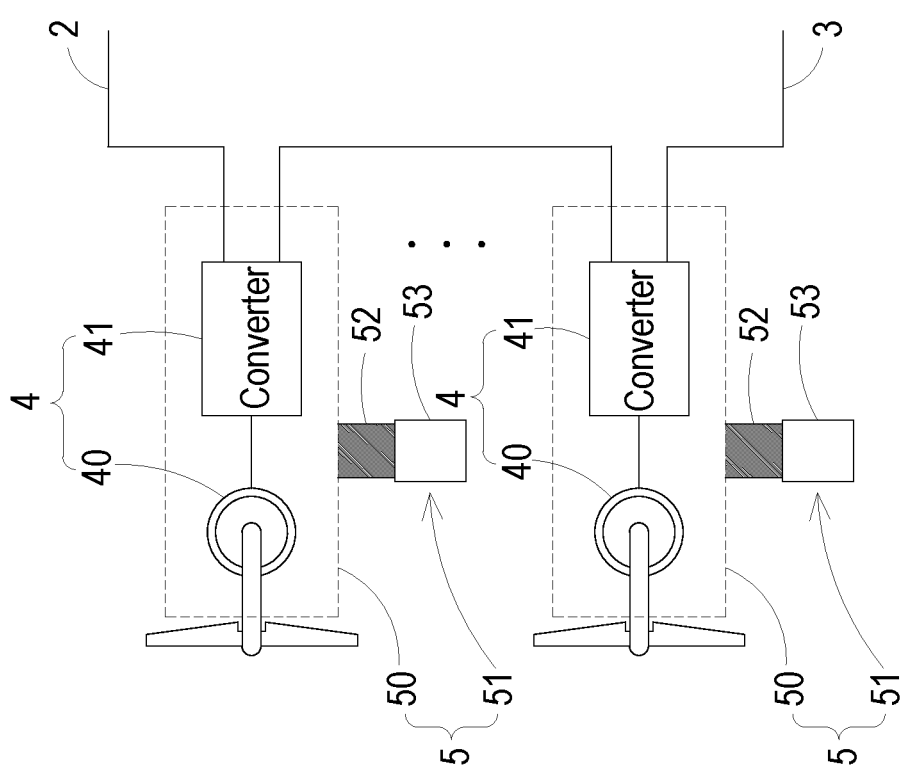
FIG. 3A schematically illustrates the architecture of an electrical system according to a first embodiment of the present disclosure.

FIG. 3A schematically illustrates the architecture of an electrical system according to a first embodiment of the present disclosure. FIG. 3B is a schematic functional block diagram illustrating some components of the electrical system as shown in FIG. 3A. As shown in FIG. 3A and FIG. 3B, the electrical system 1 includes a first conduction terminal 2, a second conduction terminal 3, at least one power unit 4 and at least one supporting device 5.

The first conduction terminal 2 is electrically connected to a DC positive bus (not shown). The second conduction terminal 3 is electrically connected with a DC negative bus (not shown). In some other embodiments, the second conduction terminal 3 is electrically connected with a certain potential or a ground terminal.

The at least one power unit 4 includes one power unit 4 or N power units 4, and N is an integer greater than or equal to 2. As shown in FIG. 3A, the electrical system 1 includes N power units 4. These power units 4 are serially connected between the first conduction terminal 2 and the second conduction terminal 3. Preferably but not exclusively, the power unit 4 includes a power terminal and an insulation structure. The power terminal is electrically conductive. Moreover, each power unit 4 includes at least one wind power generator 40 and at least one converter 41.

The number of the supporting devices 5 is equal to the number of the power units 4. That is, as shown in FIG. 3A, the electric system 1 includes N supporting devices 5. In an embodiment, each supporting device 5 includes a conductive part 50 and a support part 51. Each power unit 4 is disposed on the conductive part 50 of the corresponding supporting device 5. Moreover, the conductive part 50 of each supporting device 5 is electrically connected with the power terminal of one power unit 4. For example, the conductive part 50 of each supporting device 5 is electrically connected with the power terminal of the corresponding power unit 4. Alternatively, the conductive part 50 of the supporting device 5 is electrically connected with the power terminal of a power unit 4 adjacent to the corresponding power unit 4 of the conductive part 50. Alternatively, the conductive part 50 of the supporting device 5 is electrically connected with a reference potential of the electrical system 1. Consequently, the conductive part 50 is electrically conducted. In an embodiment, the reference potential of the electrical system 1 is a fixed potential with respect to the ground terminal. For example, the reference potential of the electrical system 1 is a midpoint potential of the electrical system 1. The support part 51 of each supporting device 5 is connected between the corresponding conductive part 50 and a ground terminal. According to the application environment of the electrical system 1, the ground terminal is the earth, the sea or any other appropriate place for providing the ground potential.

The conductive part 50 is electrically connected with the corresponding power unit 4 through a connection structure (not shown). For example, the conductive part 50 is electrically connected with the output terminal of the power unit 4 through a copper wire. The support part 51 is partially insulated or completely insulated. The support part 51 is used to support the conductive part 50 and the power unit 4. In addition, the support part 51 can withstand the insulation stress of the power unit 4 with respect to the ground potential.

In the conventional electrical system, the conductive part 50 is directly connected with the ground potential. In accordance with a feature of the present disclosure, the conductive part 50 is electrically connected with the power terminal of the power unit 4 or the reference potential of the electrical system 1. In comparison with the conventional electrical system, the voltage difference between the conductive part 50 and the power unit 4 is lower. Consequently, the insulation stress of the power unit 4 is transferred from the position between the power unit 4 and the conductive part 50 to a position between the conductive part 50 and the ground potential (e.g., ground). In addition, the insulation between the conductive part 50 and the ground potential is achieved through the support part 51. In other words, a greater portion of the insulation stress is transferred to the region between the conductive part 50 and the ground potential. The insulation design of the region between the conductive part 50 and the ground potential is easily implemented, and the associated structure is more cost-effective and simpler when compared with the technology of making the insulation of the main body of the power unit.

Due to the insulation design of the present disclosure, the insulation structure of the body of the power unit 4 is simplified. Consequently, the insulation investment cost and the volume of the power unit 4 can be reduced. The electrical system 1 of the present disclosure can use the serial connection mechanism to increase the voltage while reducing the insulation stress caused by the high voltage and increasing the power utilization. Moreover, the insulation structure is cost-effective and simple. Consequently, the application of the serial connection mechanism for increasing the voltage is expanded.

In the above embodiment, the power units 4 are electrically connected with each other in series. Even if the number of the boost transformers in the electrical system 1 is decreased, the voltage can be increased. Consequently, the number of transformation links is reduced, the power transmission efficiency of the electrical system 1 is enhanced, and the installation cost of the electrical system 1 is reduced. Moreover, the power unit 4 is disposed on the conductive part 50 of the supporting device 5. The conductive part 50 of each supporting device 5 is electrically connected with the power terminal of the power unit 4, or electrically connected with a reference potential of the electrical system 1. The support part 51 is connected between the conductive part 50 and the ground potential. In other words, the voltage stress is created in the region between the conductive part 50 and the ground potential. Consequently, the insulation requirement of the power unit 4 is reduced. Moreover, since the conductive part 50 is electrically connected with the power terminal of the power unit 4 or the reference potential of the electrical system 1, the conductive part 50 has a function similar to the Faraday cage. That is, the conductive part 50 is in a low electric field area. Consequently, the current-carrying maintenance for the power unit 4 can be performed easily.

Please refer to FIG. 3A again. In an embodiment, the conductive part 50 is a closed frame. The power unit 4 is disposed within an accommodation space of the closed frame. In some other embodiments, the conductive part 50 is an unclosed frame (i.e., a half frame). The power unit 4 is disposed within an accommodation space of the unclosed frame. Alternatively, the conductive part 50 has a plate type structure (e.g., a tray type structure). The power unit 4 is disposed on the plate type structure of the conductive part 50.

In an embodiment, there is a first voltage stress between the conductive part 50 and the corresponding power unit 4. In addition, the power unit 4 includes an insulation structure (not shown). The insulation structure of the power unit 4 is provided to insulate the first voltage stress only. There is a second voltage stress between the conductive part 50 and the ground potential. The support part 51 is provided to insulate the second voltage stress. In addition, the first voltage stress is lower than or equal to the second voltage stress.

In an embodiment, the support part 51 includes an insulation segment 52 and a non-insulation segment 53. The insulation segment 52 is arranged between the conductive part 50 and the ground potential. The insulation segment 52 is used to achieve the insulation between the conductive part 50 and the ground potential. The non-insulation segment 53 is connected between the insulation segment 52 and the ground. It is noted that numerous modifications and alterations may be made while retaining the teachings of the disclosure. For example, in another embodiment, the support part 51 includes the insulation segment 52 only, but the support part 51 is not equipped with the non-insulation segment 53. That is, the entire of the support part 51 is completely insulated. In an embodiment, the support part 51 is fixed at a specified position. Alternatively, the support part 51 is mobile. For example, the support part 51 is applied to a mobile energy storage power station.

In case that the at least one power unit 4 includes one power unit 4, the positive output terminal of the converter 41 of the power unit 4 is electrically connected with the first conduction terminal 2, and the negative output terminal of the converter 41 of the power unit 4 is electrically connected with the second conduction terminal 3.

For example, the electrical system 1 is a wind power generation system. Each power unit 4 includes at least one wind power generator 40 and at least one converter 41. The wind power generator 40 is used for converting the wind power into the AC power. By the converter 41, the AC power from the wind power generator 40 is converted into the DC power. Preferably but not exclusively, the converter 41 is a three-phase converter or a single-phase converter. The converter 41 includes an input terminal, an output positive terminal and an output negative terminal. The input terminal of the converter 41 is electrically connected with the wind power generator 40. The output positive terminal of the converter 41 in the first power unit 4 of the N power units 4 is electrically connected with the first conduction terminal 2. The output negative terminal of the converter 41 in the N-th power unit 4 of the N power units (i.e., the last power unit 4) is electrically connected with the second conduction terminal 3. The output negative terminal of the converter 41 in the i-th power unit 4 of the N power units is electrically connected with the output positive terminal of the converter 41 in the (i+1)-th power unit 4 of the N power units 4, and i is an integer smaller than or equal to (N−1).

When compared with the parallel-connected wind power generation system, the number of the cables required by the wind power generation system 1 is reduced, the fabricating cost is reduced, and the power transmission efficiency is enhanced. Moreover, the power unit 4 is disposed on the conductive part 50 of the supporting device 5. The conductive part 50 is electrically connected with the power terminal of the power unit 4 or the reference potential of the electrical system 1. The support part 51 is connected between the conductive part 50 and the ground potential. Consequently, the high voltage stress of the power unit 4 is transferred to the position between the conductive part 50 and the ground potential. Consequently, the insulation requirement of the wind power generator 40 of the power unit 4 is reduced. Moreover, since the difficulty of designing the insulation structure between the conductive part 50 and the ground potential is low, the voltage level of the electrical system 1 can be raised to a higher level or even up to the transmission voltage level (e.g., 320 kV DC). Since the conductive part 50 is connected with the power terminal, the voltage stress between the conductive part 50 and the wind power generator 40 (and the converter 41) is low. Consequently, the insulation demands on the wind power generator 40 and the converter 41 will be reduced. For example, the original low-voltage system (e.g., the parallel-connected wind power generation system) can be still used. Moreover, since the conductive part 50 is electrically connected with the power terminal of the power unit 4 or the reference potential of the electrical system 1, the conductive part 50 has a function similar to the Faraday cage. That is, the conductive part 50 is in a low electric field area. Consequently, the current-carrying maintenance for the power unit 4 can be performed easily.

Preferably, the conductive part 50 shown in FIGS. 3A and 3B is a metal frame. For example, the conductive part 50 is a nacelle on the top of the tower. In an embodiment, the nacelle is electrically connected to the output negative terminal of the converter 41. Under this circumstance, the highest voltage difference in the nacelle corresponds to the output voltage of the converter 41. In another embodiment, the nacelle is electrically connected to the output positive terminal of the converter 41. Under this circumstance, the highest voltage difference in the nacelle corresponds to the voltage difference between the output positive terminal and the output negative terminal of the power unit 4. The support part 51 is a tower that has the supporting and insulating functions.

As mentioned above, the conductive part 50 may be electrically connected to a certain potential of the electrical system 1. However, two problems may occur. Firstly, due to the insulation between the conductive part 50 and the ground potential, the lightning current cannot be released to the ground. The lightning current may cause damage of the electrical system 1. Secondly, if the conductive part 50 is connected to the jump-to-ground potential in the electrical system 1, serious electromagnetic interference and common mode current problems occur. In the worst situation, the electrical system 1 cannot be operated normally. For solving the above drawbacks, the electrical system needs to be further modified.

Figure 4A:
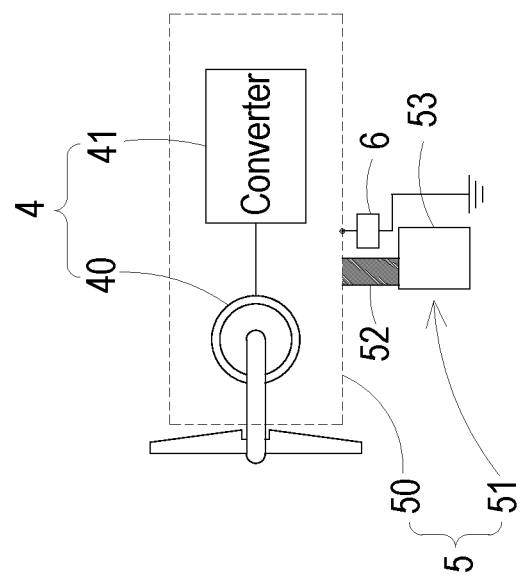
FIG. 4A schematically illustrates the architecture of an electrical system according to a second embodiment of the present disclosure.
Figure 4B:
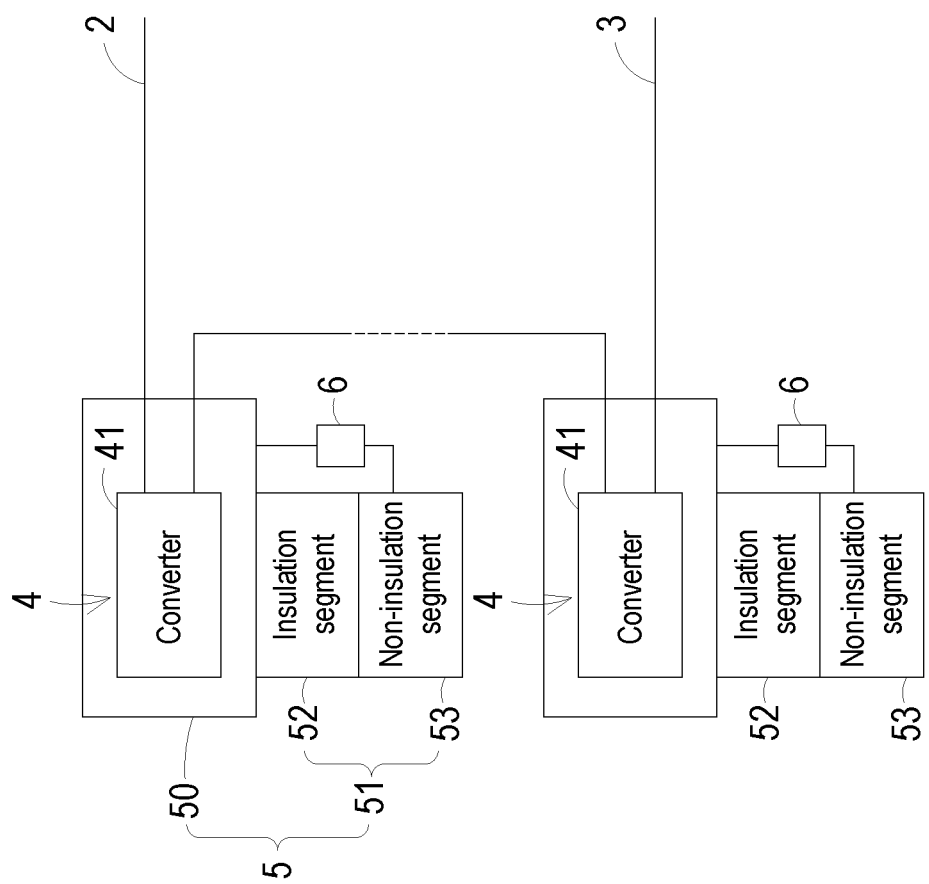
FIG. 4B is a schematic functional block diagram illustrating some components of the electrical system as shown in FIG. 4A.

FIG. 4A schematically illustrates the architecture of an electrical system according to a second embodiment of the present disclosure. FIG. 4B is a schematic functional block diagram illustrating some components of the electrical system as shown in FIG. 4A. In comparison with the first embodiment, the electrical system 1a of this embodiment further includes a voltage limiter 6. The voltage limiter 6 is connected with the insulation segment 52 of the supporting device 5 in parallel. Consequently, the lightning current can be guided to the ground. In addition, the conductive part 50 is connected to a fixed potential in the electrical system 1a other than the jump-to-ground potential. Consequently, the electromagnetic interference and common mode current problems can be avoided.

Preferably, the output terminal of the power unit 4 outputs the DC power. In an embodiment, the conductive part 50 is connected to the output terminal of the power unit 4. The number of the voltage limiters 6 is determined according to the number of the supporting devices 5 and the number of the power units 4. For example, in case that the electrical system 1a includes N supporting devices 5 and N power units 4, the electrical system 1a further includes N voltage limiters 6. Each voltage limiter 6 is connected between the conductive part 50 of the corresponding supporting device 5 and the ground potential. If the voltage at the conductive part 50 is higher than a threshold voltage, the corresponding voltage limiter 6 is switched from an off state to an on state. Consequently, the electric energy on the conductive part 50 is guided to the ground or the sea. In an embodiment, the voltage limiter 6 and the insulation segment 52 are arranged side by side. Consequently, the installation space is effectively utilized.

Figure 5A:
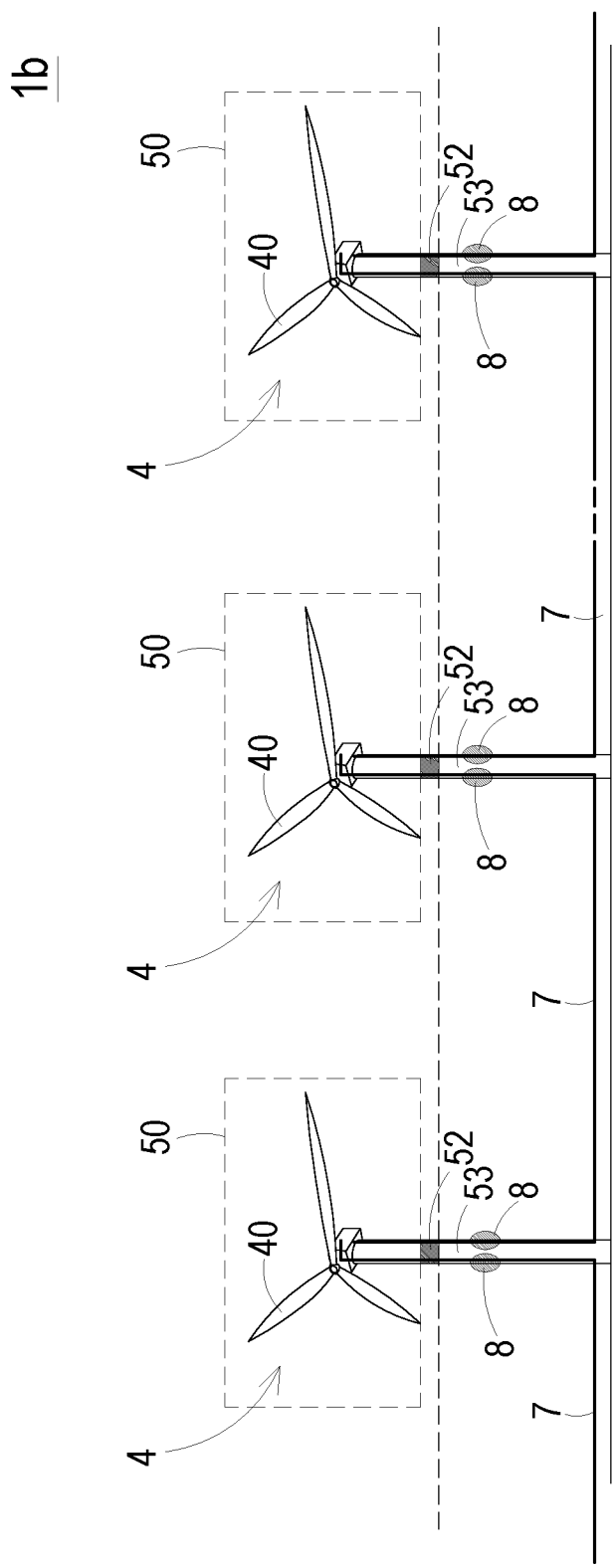
FIG. 5A schematically illustrates the architecture of an electrical system according to a third embodiment of the present disclosure.
Figure 5B:
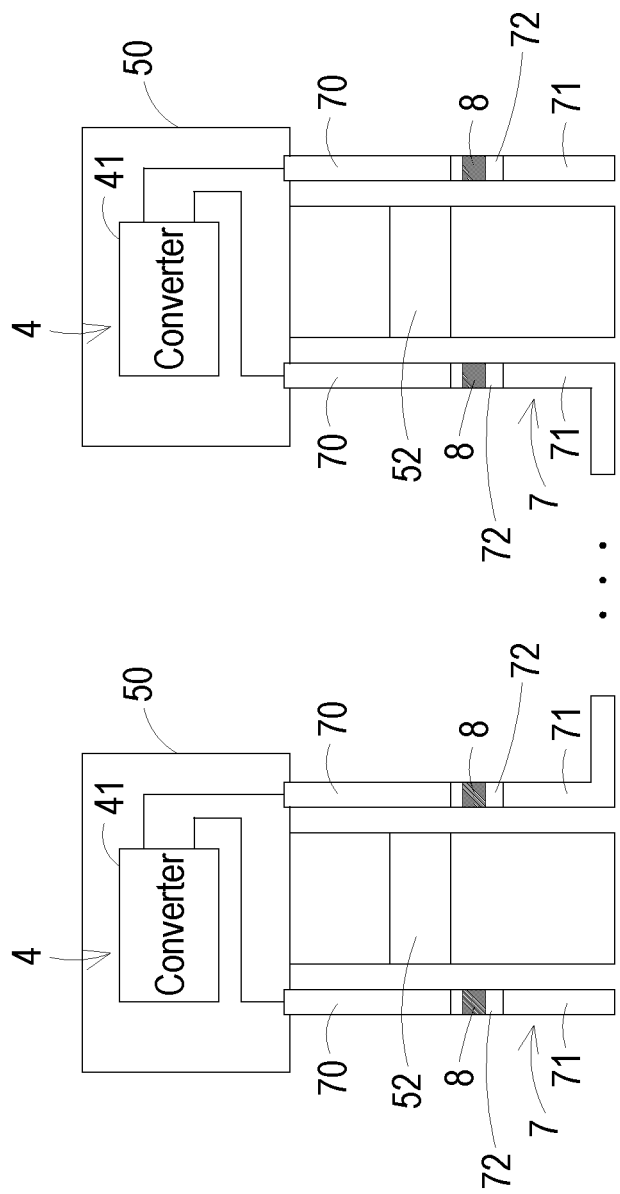
FIG. 5B is a schematic functional block diagram illustrating some components of the electrical system as shown in FIG. 5A.
Figure 5C:
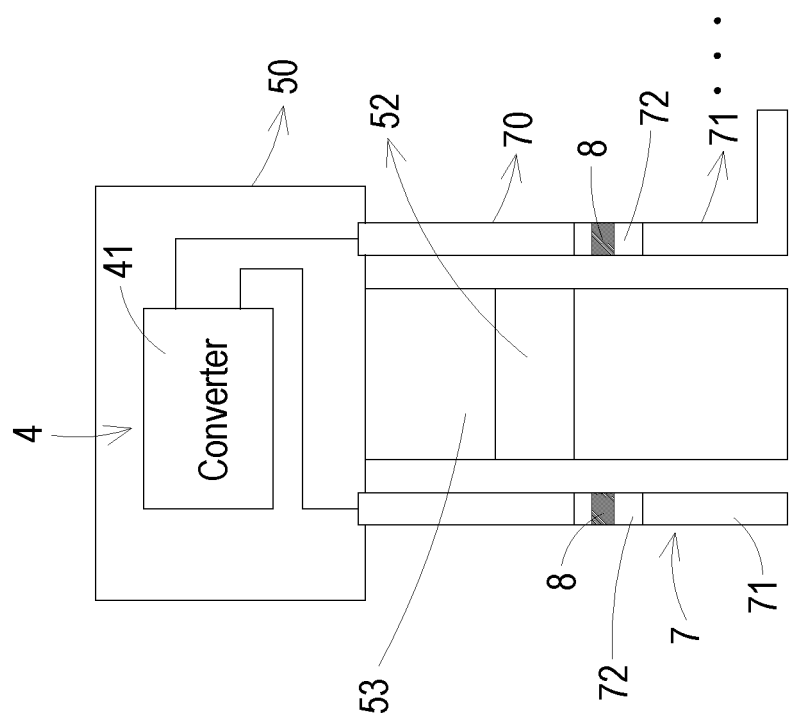
FIGS. 5C, 5D and 5E schematically illustrate some exemplary relationships between the power unit, the corresponding conductive part, the corresponding shielded cables and the corresponding stress cones in the electrical system as shown in FIG. 5A.
Figure 5D:
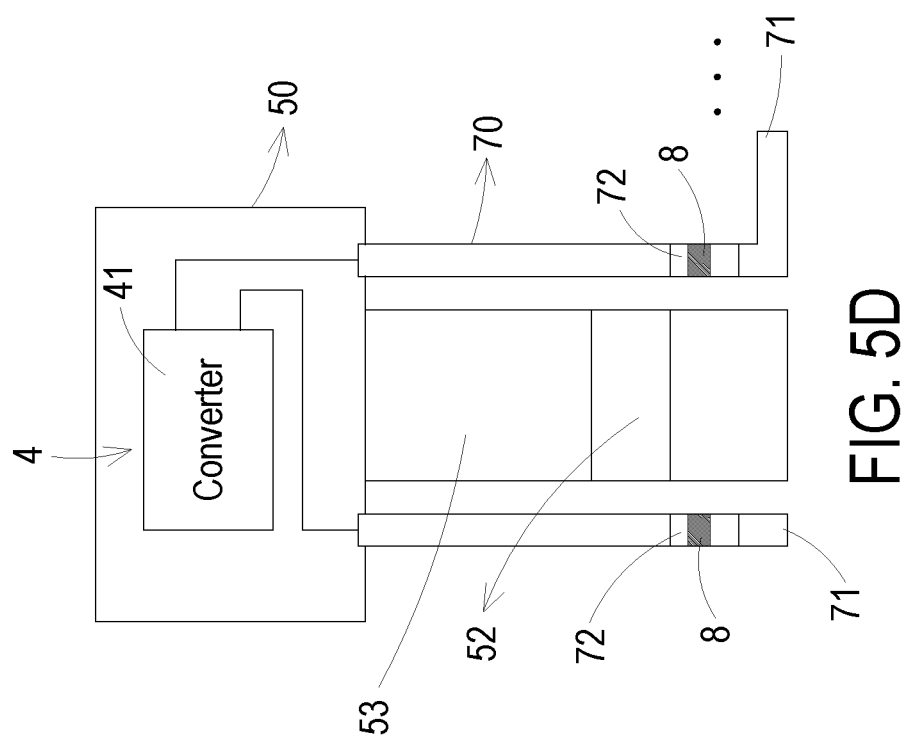
Figure 5E:
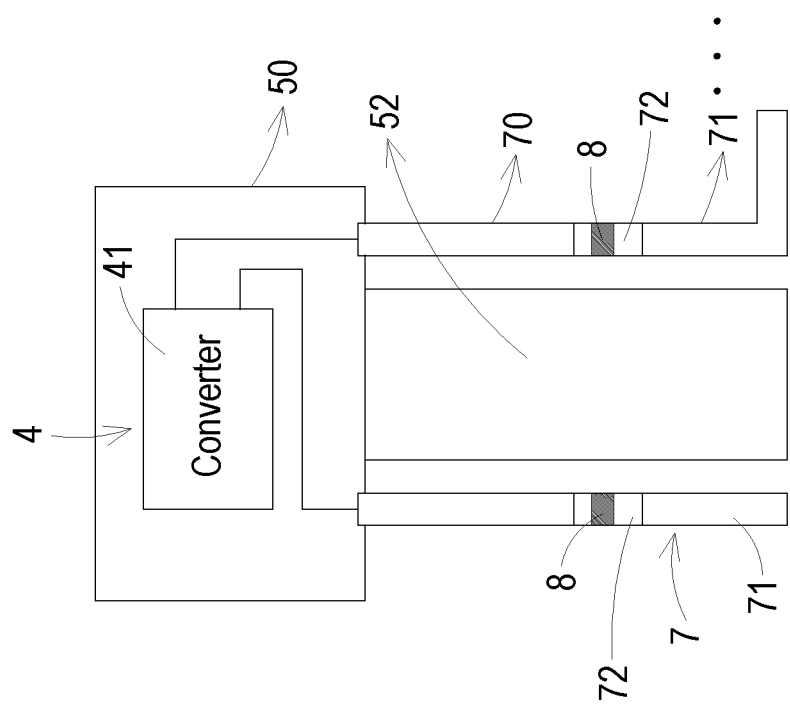

FIG. 5A schematically illustrates the architecture of an electrical system according to a third embodiment of the present disclosure. FIG. 5B is a schematic functional block diagram illustrating some components of the electrical system as shown in FIG. 5A. FIGS. 5C, 5D and 5E schematically illustrate some exemplary relationships between the power unit, the corresponding conductive part, the corresponding shielded cables and the corresponding stress cones in the electrical system as shown in FIG. 5A. In comparison with the first embodiment, the electrical system 1b of this embodiment further includes 2N shielded cables 7 and 2N stress cones 8. The N power units 4 are electrically connected with each other in series through the 2N shielded cables 7. Each power unit 4 is connected with two shielded cables 7. The outer surface of each shielded cable 7 is provided with a cable insulating layer 70, a stress layer 72 and a shielding layer 71 sequentially.

The cable insulating layer 70 is located beside the conductive part 50. Preferably the cable insulating layer 70 is contacted with the conductive part 50. The shielding layer 71 is located away from the conductive part 50. The stress layer 72 is arranged between the cable insulating layer 70 and the shielding layer 71. Due to the arrangement of the shielding layer 71, the portion of the shielded cable 7 immersed in the sea or the cable trench can be protected. Consequently, the installation of the shielded cable 7 is simplified. Each stress cone 8 is disposed in the stress layer 72 of the corresponding shielded cable 7 to reduce the influence of the electric field intensity of the shielded layer 71 in the shielded cable 7. Consequently, the lifespan of the shielded cable 7 can be extended.

In the examples of FIGS. 5B, 5C and 5D, the support part 51 is partially insulated. That is, the support part 51 includes at least one insulation segment 52 and at least one non-insulation segment 53. Under this circumstance, the stress layer 72 has to be located below the insulation segment 52. In case that the position of the insulation segment 52 in the support part 51 is adjusted, the position of the stress layer 72 in the shielded cable 7 is correspondingly changed. As such, the stress cone 8 is located below the insulation segment 52. Consequently, the safety distance between the stress cone 8 and the non-insulating segment 53 above the insulation segment 52 can meet the system requirements. In the example of FIG. 5E, the support part 51 is completely insulated. That is, the support part 51 includes the insulation segment 52 only. The stress layer 72 is arranged between the cable insulating layer 70 and the shielding layer 71. In addition, the distance between the stress layer 72 and the conductive part 50 meets the system safety distance requirement.

Figure 6:
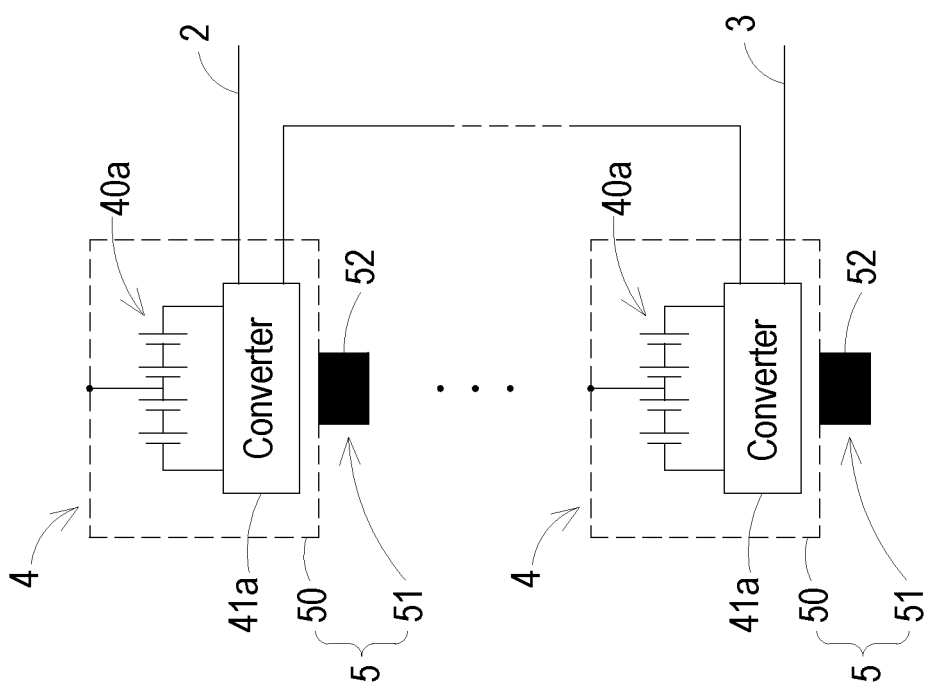
FIG. 6 schematically illustrates the architecture of an electrical system according to a fourth embodiment of the present disclosure.

FIG. 6 schematically illustrates the architecture of an electrical system according to a fourth embodiment of the present disclosure. In this embodiment, the electrical system 1c is an energy storage system. Each power unit 4 of the N power units 4 includes an energy storage battery pack 40a and a converter 41a. Each converter 41a includes an energy storage terminal, a positive conduction terminal and a negative conduction terminal. The energy storage terminal of the converter 41a is electrically connected with the energy storage battery pack 40a. The positive conduction terminal of the converter 41a in the first power unit 4 of the N power units 4 is electrically connected with the first conduction terminal 2. The negative conduction terminal of the converter 41a in the N-th power unit 4 of the N power units (i.e., the last power unit 4) is electrically connected with the second conduction terminal 3. The negative conduction terminal of the converter 41a in the i-th power unit 4 of the N power units is electrically connected with the positive conduction terminal of the converter 41a in the (i+1)-th power unit 4 of the N power units 4, and i is an integer smaller than or equal to (N−1).

The energy storage battery packs 40a are connected with each other in series to increase the voltage. Consequently, the number of the boost transformers, the equipment investment cost, the installation space area and the power transmission loss are reduced. The conductive part 50 is electrically connected with the power terminal of the power unit (e.g., a specified node between the energy storage battery packs 40a). The support part 51 is connected between the conductive part 50 and the ground potential. The support part 51 includes an insulation segment 52. Consequently, the insulation structure of the electrical system 1c are divided into two portions. The first-portion insulation structure is arranged between the conductive part 50 and the power terminal of the power unit 4. That is, the first-portion insulation structure is implemented through the insulation structure of the main body of the power unit 4. The second-portion insulation structure is arranged between the conductive part 50 and the ground potential. The second-portion insulation structure is implemented through the insulation segment 52 of the support part 51. The first-portion insulation structure is a low-voltage insulation structure. The second-portion insulation structure is a high-voltage insulation structure. Since the high voltage insulation is transferred into the insulation segment 52, the insulation design of the electrical system 1c is simplified, and the insulation demands on the main body of the power unit 4 is reduced.

Preferably, the conductive part 50 is electrically connected with the midpoint potential of the energy storage battery packs 40a. Under this circumstance, the voltage difference between the power unit 4 and the conductive part 50 can be decreased to a minimum value (e.g., a half of the voltage of the power unit 4). Consequently, the insulation stress between the conductive part 50 and the energy storage battery pack 40a is minimized. Moreover, since the safety distance between the energy storage battery pack 40a and the conductive part 50 is reduced, the volume of the conductive part 50 is reduced. Moreover, the reduction of the voltage between the energy storage battery pack 40a and the conductive part 50 can reduce the probability of fire occurrence. Consequently, the safety of the electrical system 1c is enhanced.

Preferably, the conductive part 50 of the electrical system 1c is a metal frame. For example, the conductive part 50 is a casing of an energy storage container, a cabinet or an energy storage unit. The metal frame has a function similar to the Faraday cage. The internal portion of the metal frame is a low electric field area. Consequently, the current-carrying maintenance for the power unit 4 can be performed easily. The insulation segment 52 is located outside the metal frame to support the metal frame. Since the voltage stress between the load and the power unit is reduced, the insulation demands on the output power line of the power unit will be reduced.

The functions of the electrical system 1c of this embodiment are similar to the functions of the electrical system 1 as shown in FIGS. 3A and 3B. Moreover, since the N power units 4 of the electrical system 1c are electrically connected with each other in series, the output voltage with higher voltage level can be provided. Consequently, the energy storage capacity of the electrical system 1c is increased.

Figure 7:
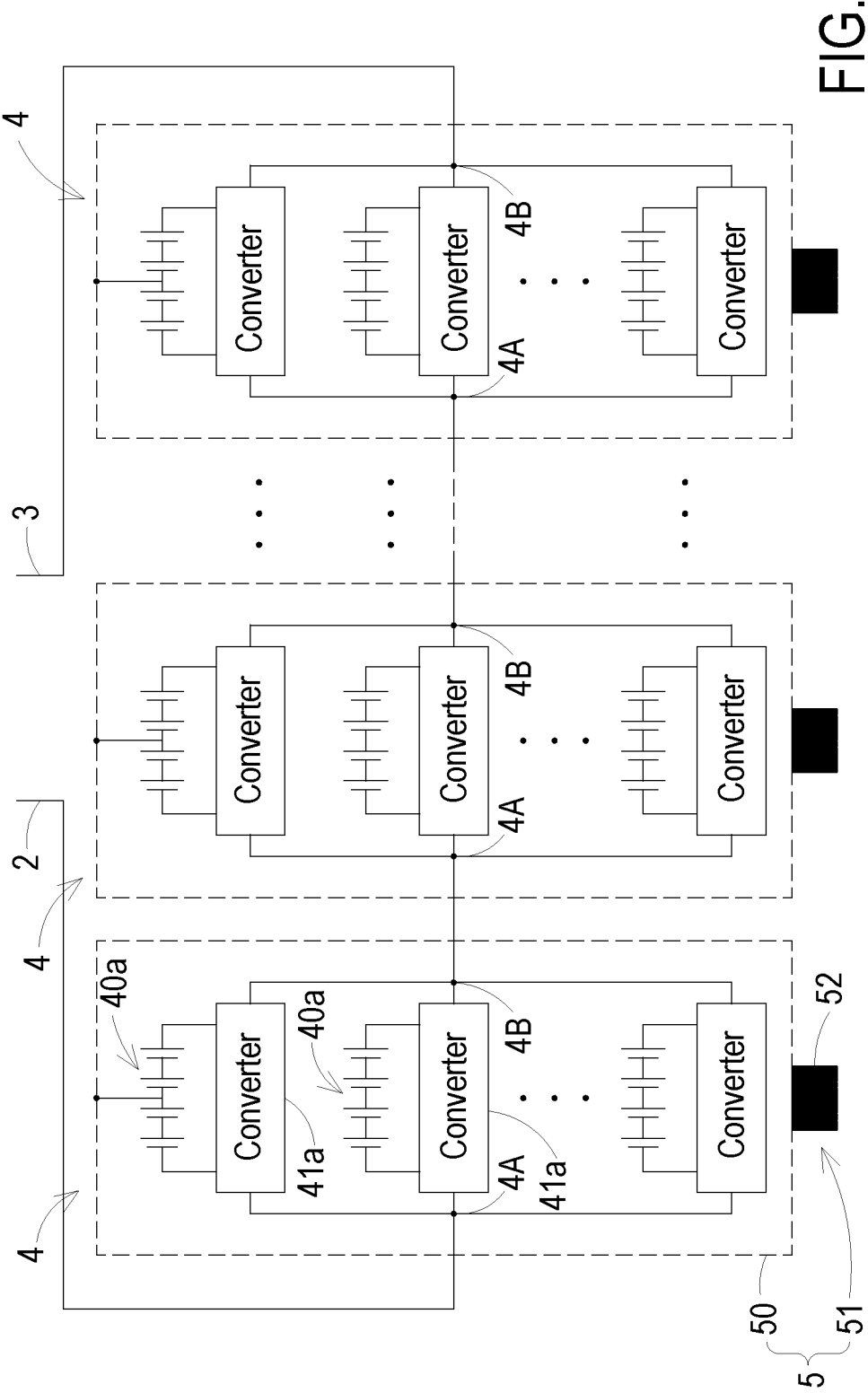
FIG. 7 schematically illustrates the architecture of an electrical system according to a fifth embodiment of the present disclosure.

FIG. 7 schematically illustrates the architecture of an electrical system according to a fifth embodiment of the present disclosure. In this embodiment, the electrical system 1d is also an energy storage system. Each power unit 4 of the N power units 4 includes M energy storage battery packs 40a and M converters 41a. Each converter 41a includes an energy storage terminal, a positive conduction terminal and a negative conduction terminal. The energy storage terminal of the converter 41a is electrically connected with the corresponding energy storage battery pack 40a. The positive conduction terminals of the M converters 41a in each power unit 4 are electrically connected with a first node 4A. The negative conduction terminals of the M converters 41a in each power unit 4 are electrically connected with a second node 4B. That is, the M converters 41a in each power unit 4 are connected with each other in parallel. The first node 4A of the first power unit 4 of the N power units 4 is electrically connected with the first conduction terminal 2. The second node 4B of the N-th power unit 4 of the N power units 4 is electrically connected with the second conduction terminal 3. The second node 4B of the i-th power unit 4 of the N power units is electrically connected with the first node 4A of the (i+1)-th power unit 4 of the N power units 4, and i is an integer smaller than or equal to (N−1), and M is an integer greater than or equal to 2.

When compared with the electrical system 1c of FIG. 6, the M energy storage battery packs 40a in each power unit 4 of this embodiment are connected with each other in parallel. The N power units 4 are connected with each other in series. Consequently, the energy storage capacity of the electrical system 1d is enhanced. In case that one of the energy storage battery packs 40a of the power unit 4 has a breakdown, the other energy storage battery packs 40a of the power unit 4 can be operated normally. Consequently, the voltage stresses of the other power units 4 are not influenced.

Figure 8:
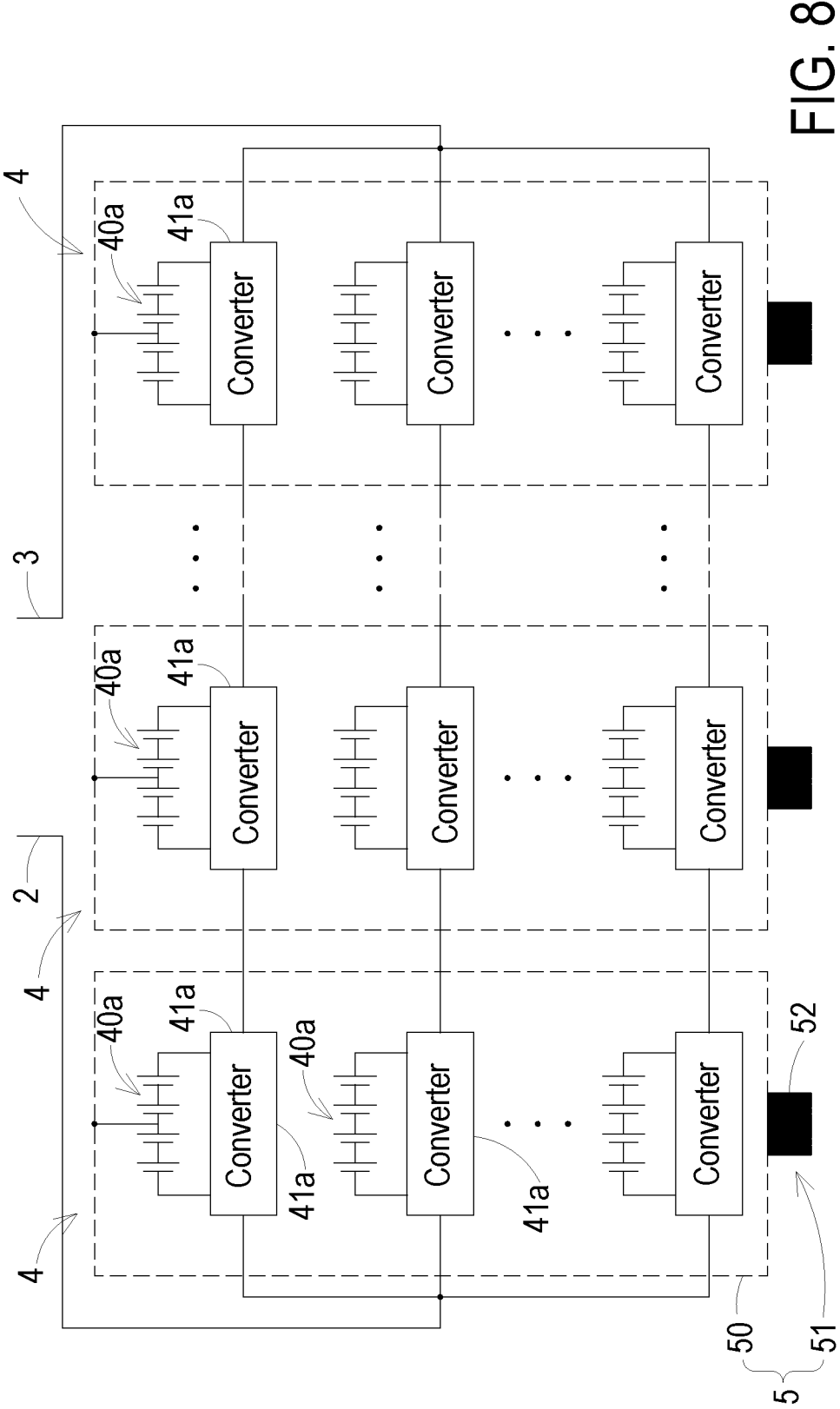
FIG. 8 schematically illustrates the architecture of an electrical system according to a sixth embodiment of the present disclosure.

FIG. 8 schematically illustrates the architecture of an electrical system according to a sixth embodiment of the present disclosure. In this embodiment, the electrical system 1e is also an energy storage system. Each power unit 4 of the N power units 4 includes M energy storage battery packs 40a and M converters 41a. Each converter 41a includes an energy storage terminal, a positive conduction terminal and a negative conduction terminal. The energy storage terminal of the converter 41a is electrically connected with the corresponding energy storage battery pack 40a. The positive conduction terminals of the M converters 41a in the first power unit 4 of the N power units 4 are connected with each other and connected with the first conduction terminal 2. The negative conduction terminals of the M converters 41a in the N-th power unit 4 (i.e., the last power unit 4) are connected with each other and connected with the second conduction terminal 3. The negative conduction terminal of the j-th converter 41a in the i-th power unit 4 of the N power units 4 is electrically connected with the positive conduction terminal of the j-th converter 41a in the (i+1)-th power unit 4 of the N power units 4. That is, the j-th converters 41a in the N power units 4 are connected with each other in series, i is an integer smaller than or equal to (N−1), j is an integer greater than or equal to 1, and M is an integer greater than or equal to j. In an embodiment, the j-th converter 41a in one of the N power units 4 is at the same potential as the j-th converter 41a in the other of the N power units 4.

When compared with the electrical system 1c of FIG. 6, the corresponding energy storage battery packs 40a in the N power units 4 of the electrical system 1e of this embodiment are connected with each other in series. Consequently, the energy storage capacity of the electrical system 1e is enhanced. In case that one of the energy storage battery packs 40a of any power unit 4 has a breakdown, the energy storage battery packs 40a with the breakdown are bypassed, and the other energy storage battery packs 40a of the power unit 4 can be operated normally.

Figure 9:
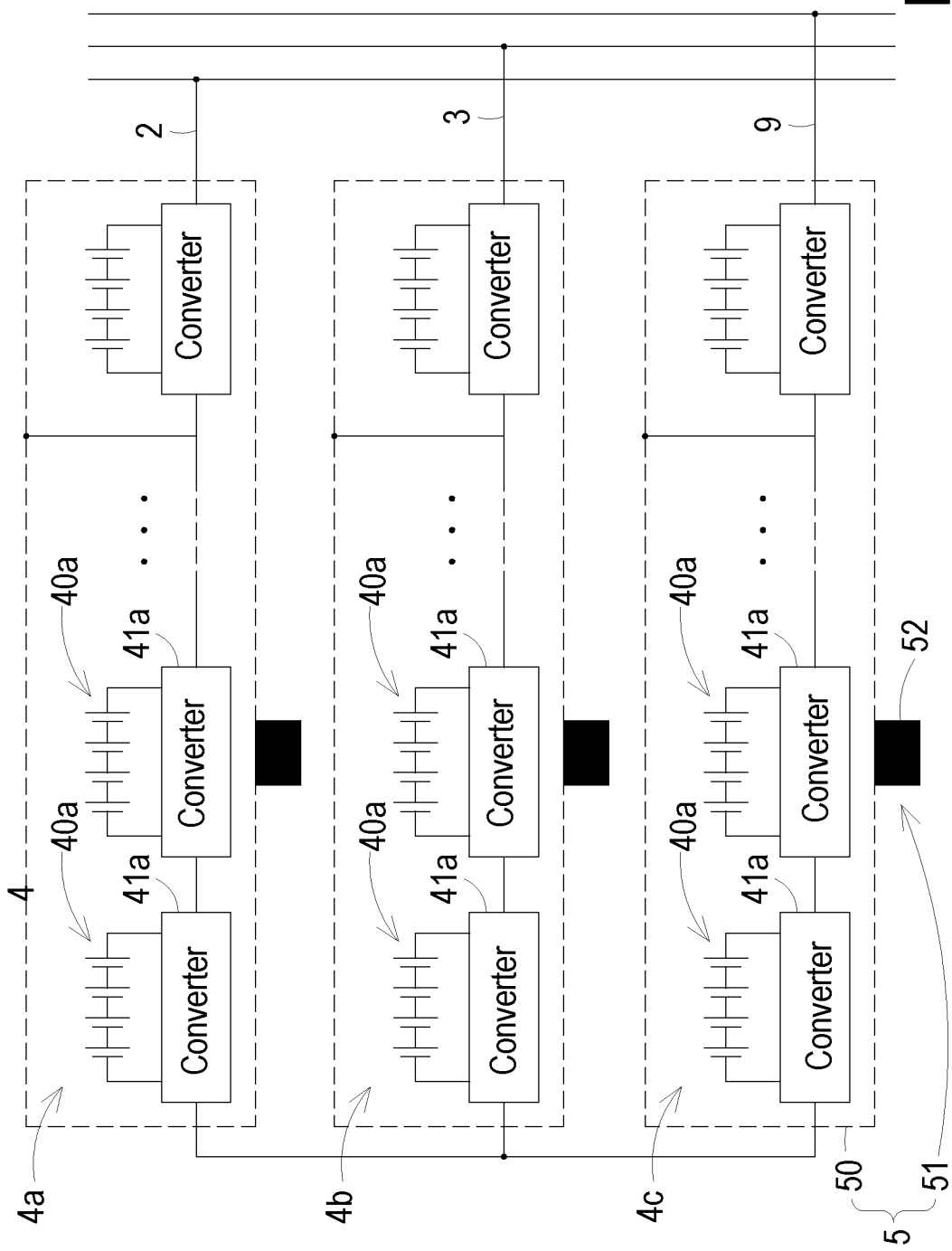
FIG. 9 schematically illustrates the architecture of an electrical system according to a seventh embodiment of the present disclosure.

FIG. 9 schematically illustrates the architecture of an electrical system according to a seventh embodiment of the present disclosure. In this embodiment, the electrical system 1f is a three-phase energy storage system. The electrical system 1f includes a first conduction terminal 2, a second conduction terminal 3 and a third conduction terminal 9. The electrical system 1f includes three power units, i.e., a first power unit 4a, a second power unit 4b and a third power unit 4c. Each of the three power units 4a, 4b and 4c includes M energy storage battery packs 40a and M converters 41a. Each converter 41a includes an energy storage terminal, a positive conduction terminal and a negative conduction terminal.

The positive conduction terminal of the first converter 41a of the M converters 41a in the first power unit 4a is electrically connected with the first conduction terminal 2. The positive conduction terminal of the first converter 41a of the M converters 41a in the second power unit 4b is electrically connected with the second conduction terminal 3. The positive conduction terminal of the first converter 41a of the M converters 41a in the third power unit 4c is electrically connected with the third conduction terminal 9. The negative conduction terminal of the M-th converter 41a of the M converters 41a in the first power unit 4a, the negative conduction terminal of the M-th converter 41a of the M converters 41a in the second power unit 4b and the negative conduction terminal of the M-th converter 41a of the M converters 41a in the third power unit 4c are electrically connected with each other. In each of the first power unit 4a, the second power unit 4b and the third power unit 4c, the negative conduction terminal of the j-th converter 41a is electrically connected with the positive conduction terminal of the (j+1)-th converter 41a, and M is an integer greater than or equal to 2, and j is an integer smaller than or equal to (M−1). Since the electrical system 1f is the three-phase energy storage system, the overall system capacity of the electrical system 1f is enhanced.

Figure 10:
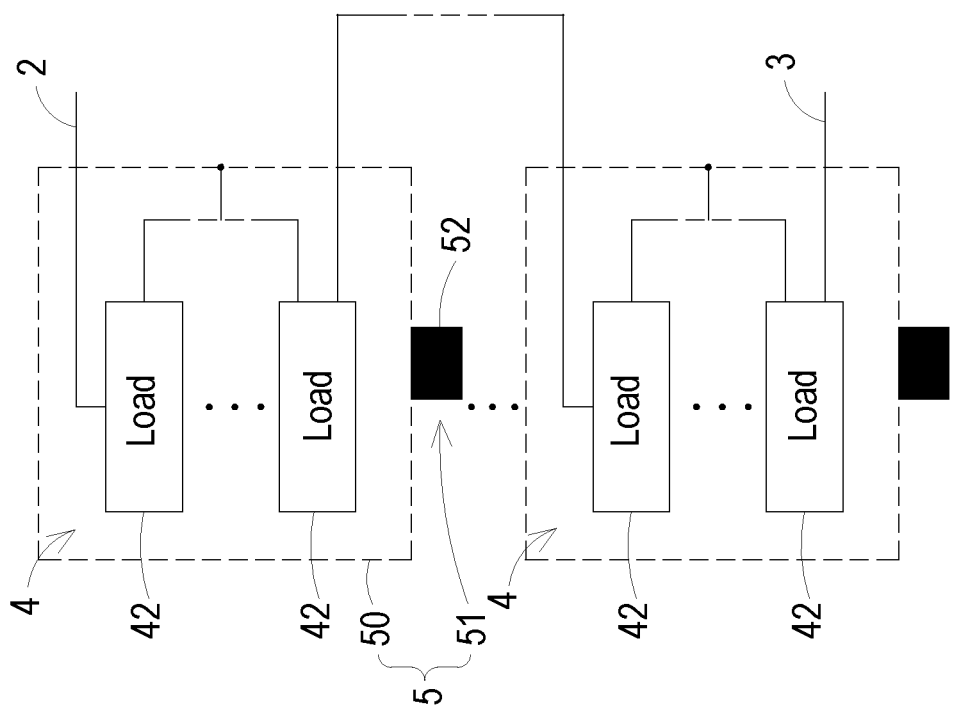
FIG. 10 schematically illustrates the architecture of an electrical system according to an eighth embodiment of the present disclosure.

FIG. 10 schematically illustrates the architecture of an electrical system according to an eighth embodiment of the present disclosure. In this embodiment, the electrical system 1g is a data center system. The electrical system 1g includes N power units 4. Each of the power units 4 includes M loads 42. Each load 42 has an input positive terminal and an input negative terminal. The input positive terminal of the first load 42 of the M loads 42 in the first power unit 4 is electrically connected with the first conduction terminal 2. The input negative terminal of the M-th load 42 of the M loads 42 in the N-th power unit 4 (i.e., the last power unit 4) is electrically connected with the second conduction terminal 3. In each power unit 4, the input negative terminal of the j-th load 42 is electrically connected with the input positive terminal of the (j+1)-th load 42. In the N power units 4, the input negative terminal of the M-th load 42 in the i-th power unit 4 is electrically connected with the input positive terminal of the first load 42 in the (i+1)-th power unit 4, M is an integer greater than or equal to 2, j is an integer smaller than or equal to (M−1), and i is an integer smaller than or equal to (N−1).

The loads 42 are connected with each other in series to increase the voltage. Consequently, the number of the boost transformers, the equipment investment cost, the installation space area and the power transmission loss are reduced. The conductive part 50 is electrically connected with the power terminal of the power unit 4 (e.g., a specified node between the loads 42). The support part 51 is connected between the conductive part 50 and the ground potential. The support part 51 includes an insulation segment 52. Consequently, the insulation structure of the electrical system 1g is divided into two portions. The first-portion insulation structure is arranged between the conductive part 50 and the power terminal of the power unit 4. That is, the first-portion insulation structure is implemented through the insulation structure of the main body of the power unit 4. The second-portion insulation structure is arranged between the conductive part 50 and the ground potential. The second-portion insulation structure is implemented through the insulation segment 52 of the support part 51. The first-portion insulation structure is a low-voltage insulation structure. The second-portion insulation structure is a high-voltage insulation structure. Since the high voltage insulation is transferred into the insulation segment 52, the insulation design of the electrical system 1g is simplified, and the insulation demands on the main body of the power unit 4 is reduced.

Preferably, the conductive part 50 is electrically connected with the midpoint potential of the plurality of loads 42. Under this circumstance, the voltage difference between the power unit 4 and the conductive part 50 can be decreased to a minimum value (e.g., a half of the voltage of the power unit 4). Consequently, the insulation stress between the conductive part 50 and the load 42 is minimized. Moreover, since the safety distance between the load 42 and the conductive part 50 is reduced, the volume of the conductive part 50 is reduced.

Preferably, the conductive part 50 of the electrical system 1g is a metal frame. For example, the conductive part 50 is a cabinet. The metal frame has a function similar to the Faraday cage. The internal portion of the metal frame is a low electric field area. Consequently, the current-carrying maintenance for the power unit 4 can be performed easily.

In this embodiment, the N power units 4 are electrically connected with each other in series, and the M loads 42 in each power unit 4 are electrically connected with each other in series. Consequently, the electrical system 1g can receive the voltage with the higher voltage level. Since the M loads 42 in each power unit 4 are electrically connected with each other in series, the system capacity of the data center system is enhanced. Moreover, this technology can be applied to the installation of a large-scale data center system.

Figure 11:
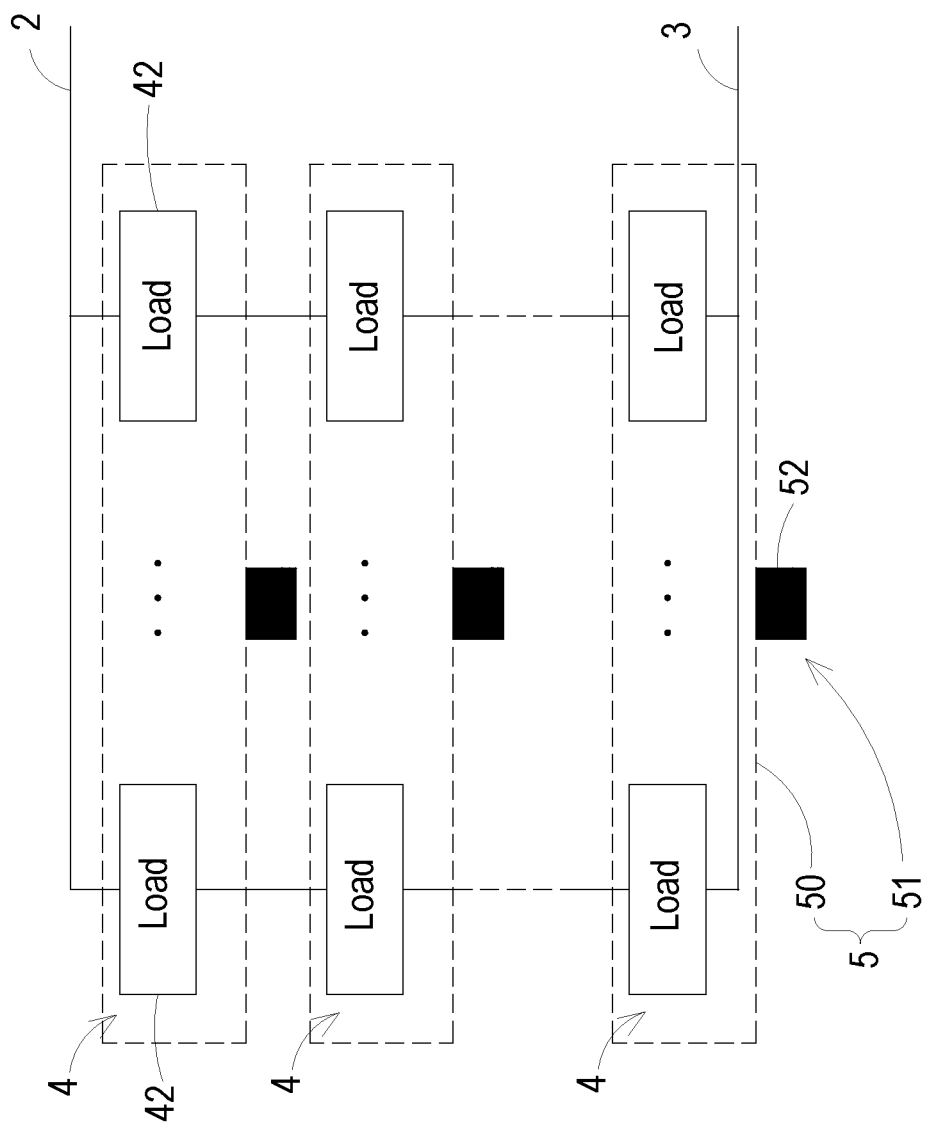
FIG. 11 schematically illustrates the architecture of an electrical system according to a ninth embodiment of the present disclosure.

FIG. 11 schematically illustrates the architecture of an electrical system according to a ninth embodiment of the present disclosure. In this embodiment, the electrical system 1h is a data center system. Each of the N power units 4 includes M loads 42. Each load 42 has an input positive terminal and an input negative terminal. The input positive terminals of all loads 42 in the first power unit 4 of the N power units 4 are electrically connected with each other and connected with the first conduction terminal 2. The input negative terminals of all loads 42 in the N-th power unit 4 of the N power units 4 are electrically connected with each other and connected with the second conduction terminal 3. The negative conduction terminal of the j-th load 42 in the i-th power unit 4 of the N power units 4 is electrically connected with the positive conduction terminal of the j-th load 42 in the (i+1)-th power unit 4 of the N power units 4, M is an integer greater than or equal to 2, j is an integer smaller than or equal to (M−1), and i is an integer smaller than or equal to (N−1). In an embodiment, the M loads 42 in any power unit 4 are at the same potential.

The functions of the electrical system 1h of this embodiment are similar to the functions of the electrical system 1g as shown in FIG. 10. Moreover, since all loads 42 in each power unit 4 of the electrical system 1h are electrically connected with each other in parallel, the system capacity of the data center system is enhanced. Moreover, this technology can be applied to the installation of a large-scale data center system.

Figure 12:
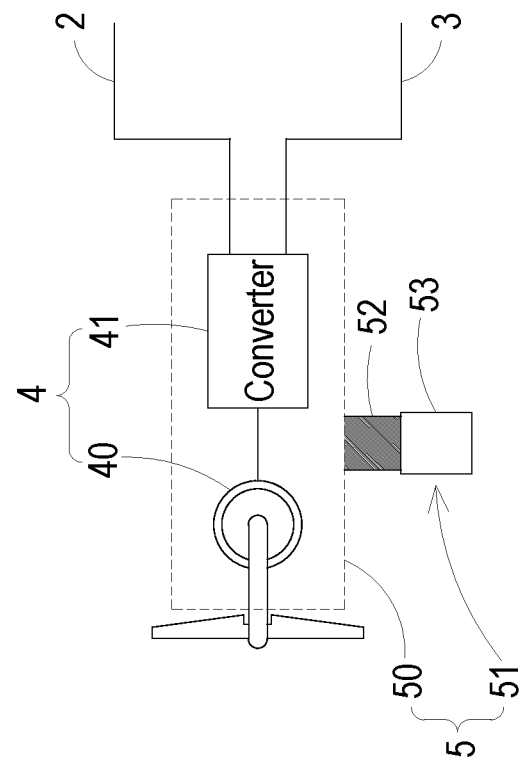
FIG. 12 schematically illustrates the architecture of an electrical system according to a tenth embodiment of the present disclosure.

FIG. 12 schematically illustrates the architecture of an electrical system according to a tenth embodiment of the present disclosure. In comparison with the electrical system 1 as shown in FIGS. 3A and 3B, the electrical system 1i of this embodiment includes a single power unit 4 and a single supporting device 5. The electrical system 1i is a wind power generation system. The power unit 4 is electrically connected between the first conduction terminal 2 and the second conduction terminal 3. That is, the output positive terminal of the converter 41 of the power unit 4 is electrically connected with the first conduction terminal 2, and the output negative terminal of the converter 41 is electrically connected with the second conduction terminal 3. The power unit 4 includes a wind power generator 40 and a converter 41. The wind power generator 40 is a high-voltage wind turbine, and the converter 41 is a high-voltage converter for outputting a high-voltage DC power.

Figure 13:
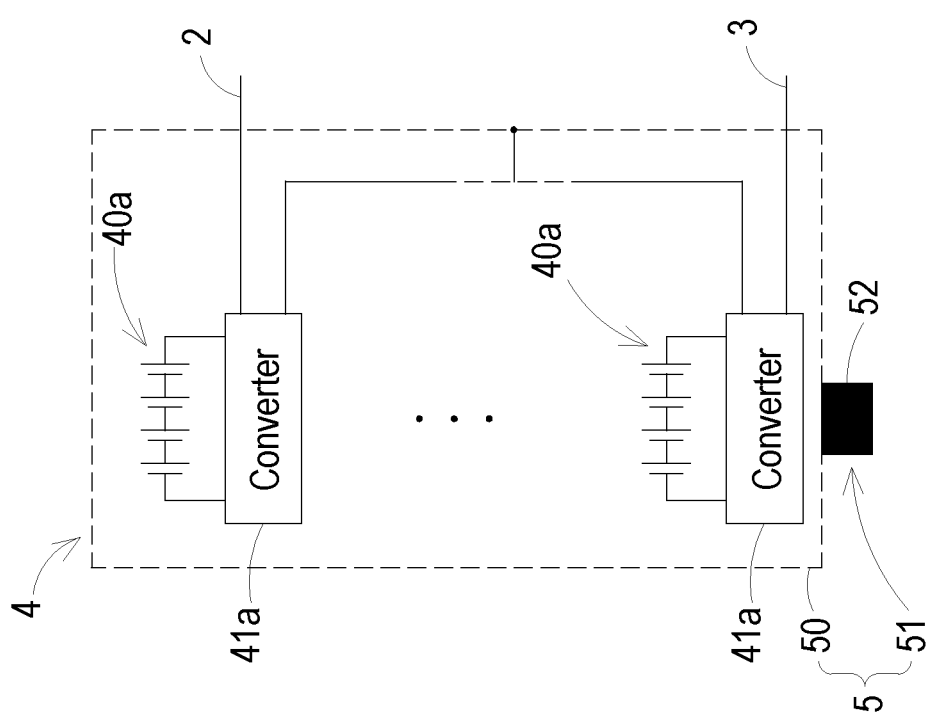
FIG. 13 schematically illustrates the architecture of an electrical system according to an eleventh embodiment of the present disclosure.

FIG. 13 schematically illustrates the architecture of an electrical system according to an eleventh embodiment of the present disclosure. In this embodiment, the electrical system 1j is an energy storage system. The electrical system 1j includes a single power unit 4 and a single supporting device 5. The power unit 4 includes M energy storage battery packs 40a and M converters 41a. Each converter 41a includes an energy storage terminal, a positive conduction terminal and a negative conduction terminal. The energy storage terminal of the converter 41a is electrically connected with the energy storage battery pack 40a. The positive conduction terminal of the first converter 41a of the M converters 41a is electrically connected with the first conduction terminal. The negative conduction terminal of the M-th converter 41a of the M converter 41a is electrically connected with the second conduction terminal 3. The negative conduction terminal of the i-th converter 41a of the M converters 41a is electrically connected with the positive conduction terminal of the (i+1)-th converter 41a of the M converters 41a, M is an integer greater than or equal to 2, and i is an integer smaller than or equal to (M−1).

Figure 14:
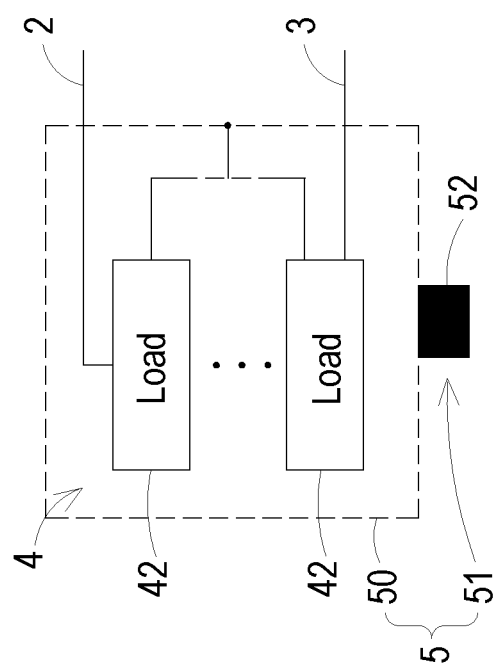
FIG. 14 schematically illustrates the architecture of an electrical system according to a twelfth embodiment of the present disclosure.

FIG. 14 schematically illustrates the architecture of an electrical system according to a twelfth embodiment of the present disclosure. In an embodiment, the electrical system 1k is a data center system. The electrical system 1k includes a single power unit 4 and a single supporting device 5. The power unit 4 includes M loads 42. Each load 42 includes an input positive terminal and an input negative terminal. The input positive terminal of the first load 42 of the M loads 42 is electrically connected with the first conduction terminal 2. The input negative terminal of the M-th load 42 of the M loads 42 is electrically connected with the second conduction terminal 3. The input negative terminal of the i-th load 42 of the M loads 42 is electrically connected with the input positive terminal of the (i+1)-th load 42 of the M loads 42, M is an integer greater than or equal to 2, and i is an integer smaller than or equal to (M−1).

In the above embodiments, the conducive part 50 is electrically connected with the power terminal of the corresponding power unit 4, or the conductive part 50 is electrically connected with the power terminal of the adjacent power unit 4, or the conductive part 50 is electrically connected with the reference potential of the electrical system. Consequently, the conductive part 50 is electrically conducted. The power terminal is a DC terminal or an AC terminal. The reference potential is a DC potential or an AC potential. In the embodiment of FIG. 4B, the voltage outputted from the converter 41 is the DC voltage, and the conductive part 50 is connected with the DC output terminal of the converter 41. In the embodiment of FIG. 6, the conductive part 50 is connected with the midpoint of the energy storage battery packs 40a, and the conductive part 50 is connected with the DC terminal. Consequently, the electromagnetic interference and common mode current problems can be avoided. It is noted that numerous modifications and alterations may be made while retaining the teachings of the disclosure. For example, in some embodiments, the converter may output AC power or receive AC power. Under this circumstance, the input terminal of the converter is the AC terminal, and/or the output terminal of the converter is the AC terminal. For example, the converter 41 as shown in FIG. 4B is a MMC (modular multilevel converter) for outputting the single-phase AC current. Under this circumstance, the input terminal and the output terminal of the converter 41 are AC terminals. The conductive part 50 is electrically connected with the AC terminal.

Some examples of the converter in the power unit will be described as follows. FIGS. 15A to 15K are schematic circuit diagrams illustrating the circuitry topologies of some examples of the converter in the power unit of the electrical system of the present disclosure. The circuitry topologies of the converter as shown in FIGS. 15A to 15K may be applied to the power unit of an energy storage system (e.g., the converter 41a shown in FIG. 6).

Figure 15B:
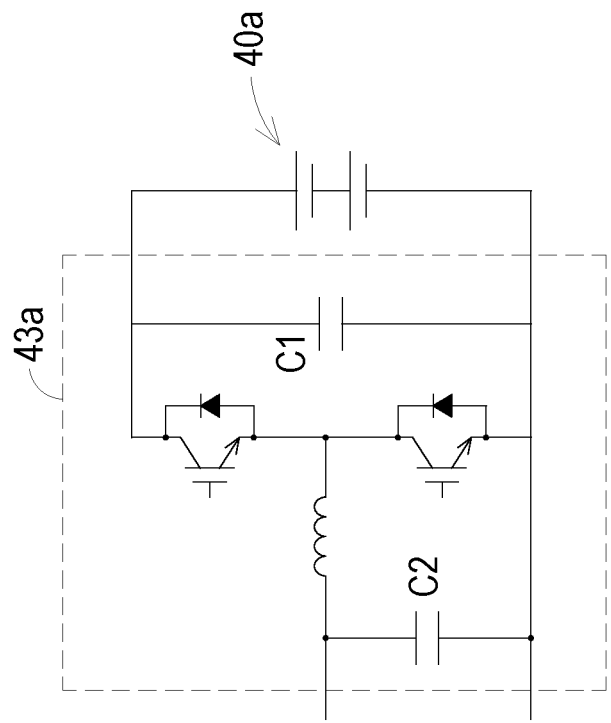
FIGS. 15A to 15K are schematic circuit diagrams illustrating the circuitry topologies of some examples of the converter in the power unit of the electrical system of the present disclosure.
Figure 15A:
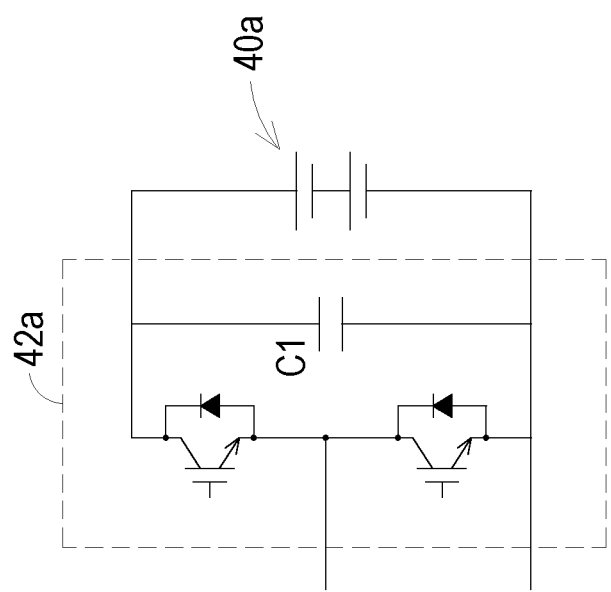

In the example of FIG. 15A, the converter includes a half-bridge circuit 42a. The energy storage battery pack 40a is electrically connected with a high-voltage side bus capacitor C1 of the half-bridge circuit 42a in parallel. The AC side of the half-bridge circuit 42a is electrically connected with another power unit 4, the first conduction terminal 2 or the second conduction terminal 3.

In the example of FIG. 15B, the converter includes a half-bridge circuit 43a. The energy storage battery pack 40a is electrically connected with a high-voltage side bus capacitor C1 of the half-bridge circuit 43a in parallel. A low-voltage side bus capacitor C2 of the half-bridge arm 43a is electrically connected with another power unit 4, the first conduction terminal 2 or the second conduction terminal 3.

Figure 15C:
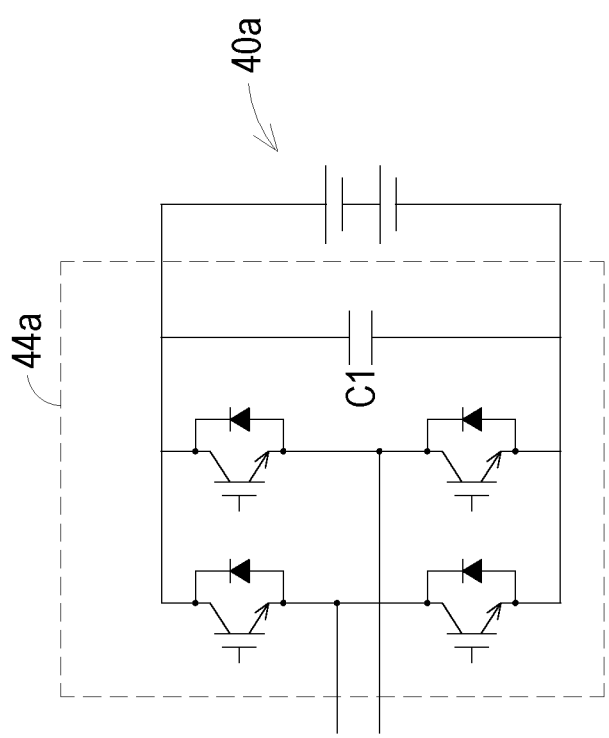

In the example of FIG. 15C, the converter 41a includes a full-bridge circuit 44a. The energy storage battery pack 40a is electrically connected with a high-voltage side bus capacitor C1 of the full-bridge circuit 44a in parallel. The AC side of the full-bridge circuit 44a is electrically connected with another power unit 4, the first conduction terminal 2 or the second conduction terminal 3.

Figure 15E:
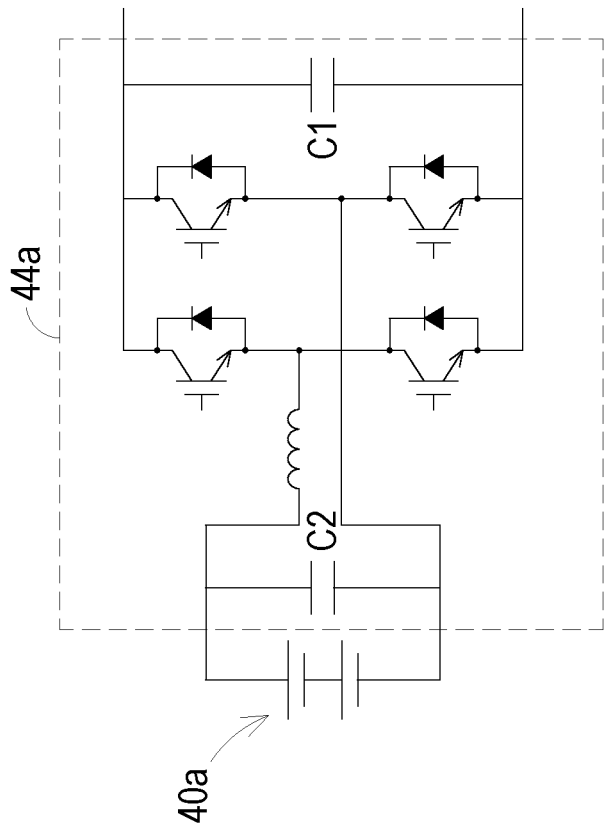
Figure 15D:
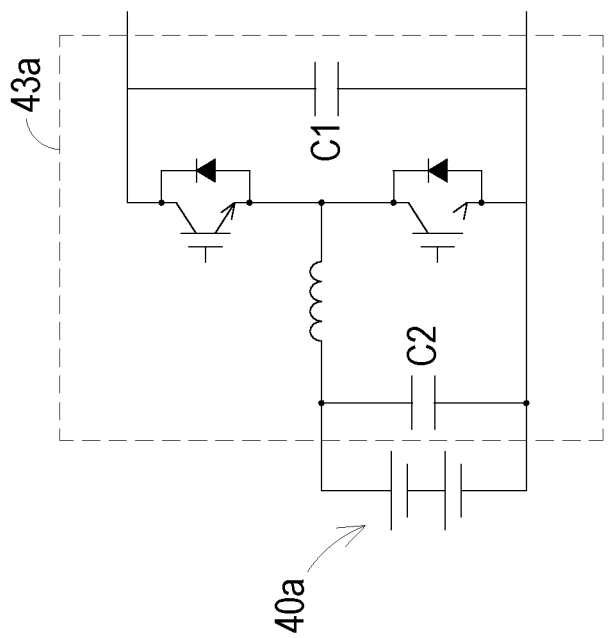

In the example of FIG. 15D, the converter includes a half-bridge circuit 43a. The energy storage battery pack 40a is electrically connected with a low-voltage side bus capacitor C2 of the half-bridge circuit 43a in parallel. A high-voltage side bus capacitor C1 of the half-bridge circuit 43a is electrically connected with another power unit 4, the first conduction terminal 2 or the second conduction terminal 3.

In the example of FIG. 15E, the converter 41a includes a full-bridge circuit 44a. The energy storage battery pack 40a is electrically connected with a low-voltage side bus capacitor C2 of the full-bridge circuit 44a in parallel. A high-voltage side bus capacitor C1 of the full-bridge circuit 44a is electrically connected with another power unit 4, the first conduction terminal 2 or the second conduction terminal 3.

Figures 15F, 15G:
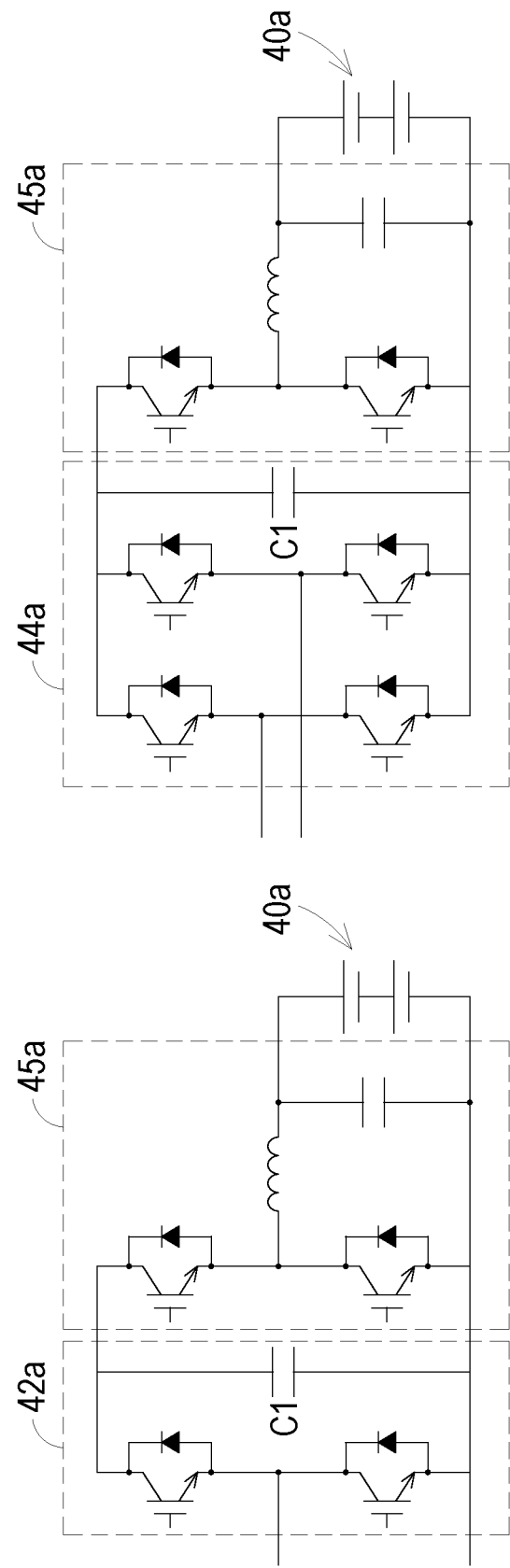

In the example of FIG. 15F, the converter includes a half-bridge circuit 42a and a DC/DC conversion circuit 45a. The DC/DC conversion circuit 45a is electrically connected between the half-bridge circuit 42a and the energy storage battery pack 40a.

In the example of FIG. 15G, the converter includes a full-bridge circuit 44a and a DC/DC conversion circuit 45a. The DC/DC conversion circuit 45a is electrically connected between the full-bridge circuit 44a and the energy storage battery pack 40a.

In the examples of FIGS. 15A to 15G, the convert has a parallel-connected circuitry topology.

Figure 15H:
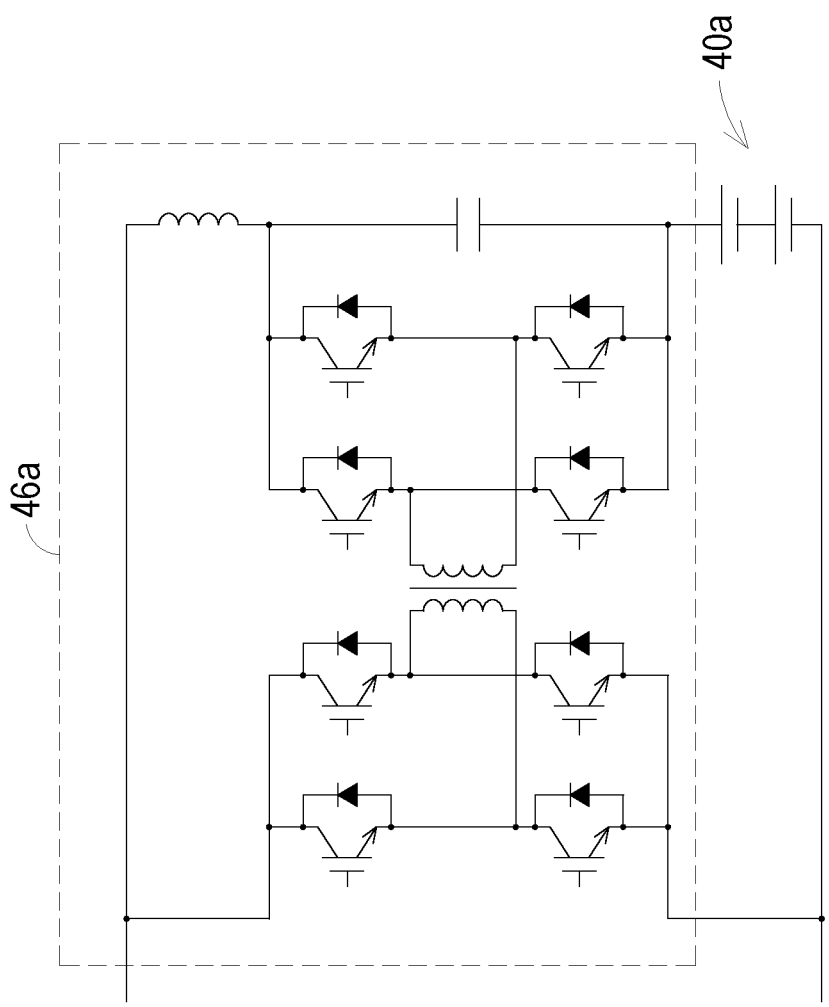

In the example of FIG. 15H, the converter includes a dual full-bridge circuit 46a. The energy storage battery pack 40a is electrically connected with the input side of the converter. The output side of the converter is electrically connected with another power unit 4, the first conduction terminal 2 or the second conduction terminal 3.

Figure 15I:
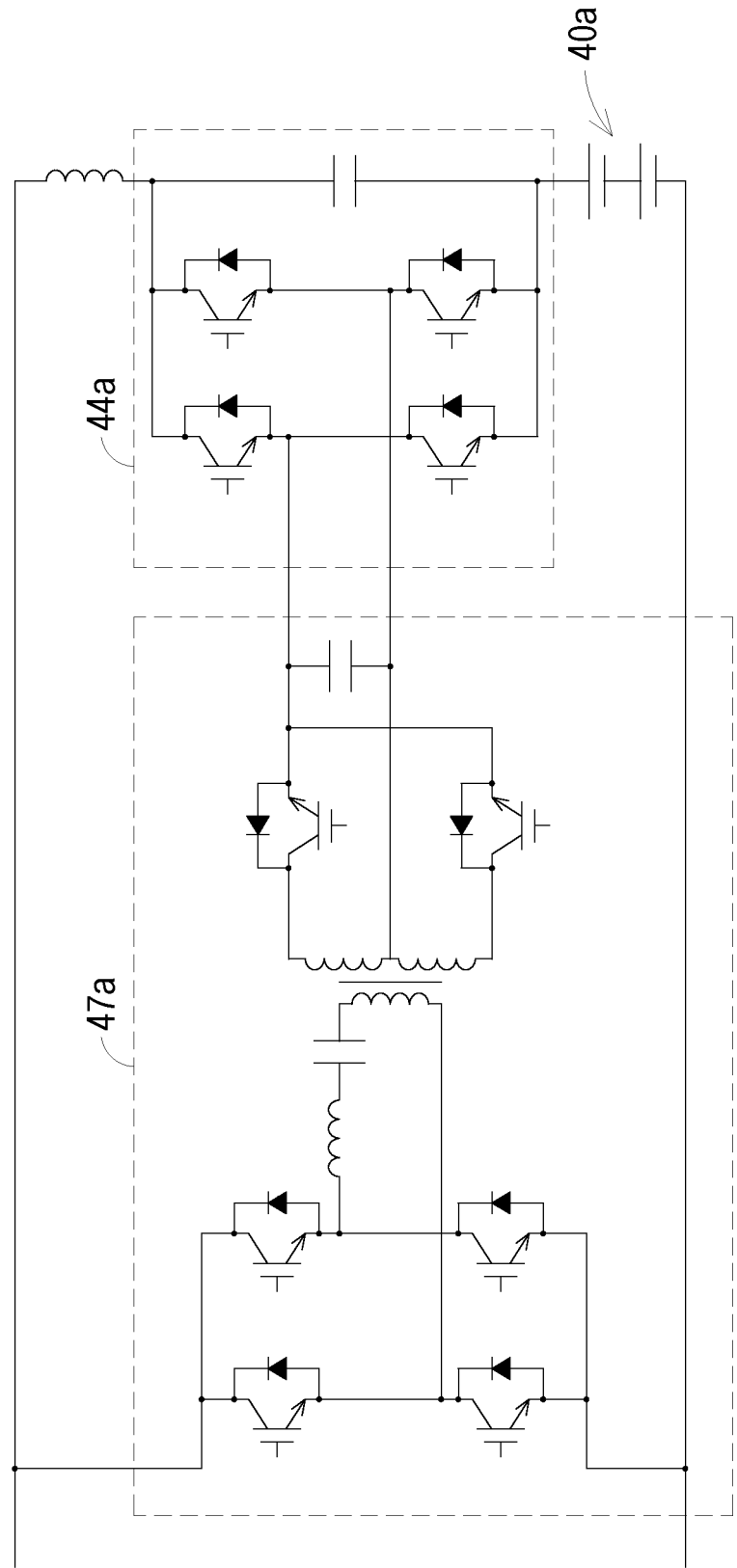

In the example of FIG. 15I, the converter includes a full-bridge circuit 44a and an LLC conversion circuit 47a. The energy storage battery pack 40a is electrically connected with the input side of the converter. The output side of the converter is electrically connected with another power unit 4, the first conduction terminal 2 or the second conduction terminal 3.

Figure 15J:
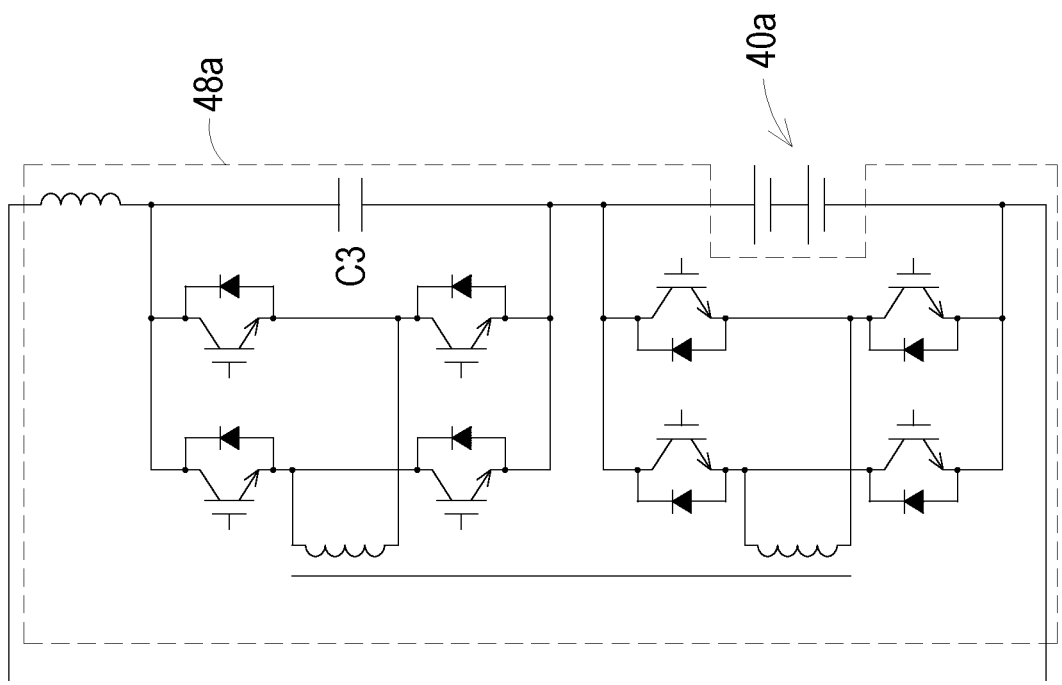

In the example of FIG. 15J, the converter includes a dual full-bridge circuit 48a. The energy storage battery pack 40a is connected with the input side of the converter in parallel. An output side capacitor C3 of the converter is electrically connected with the energy storage battery pack 40a in series.

Figure 15K:
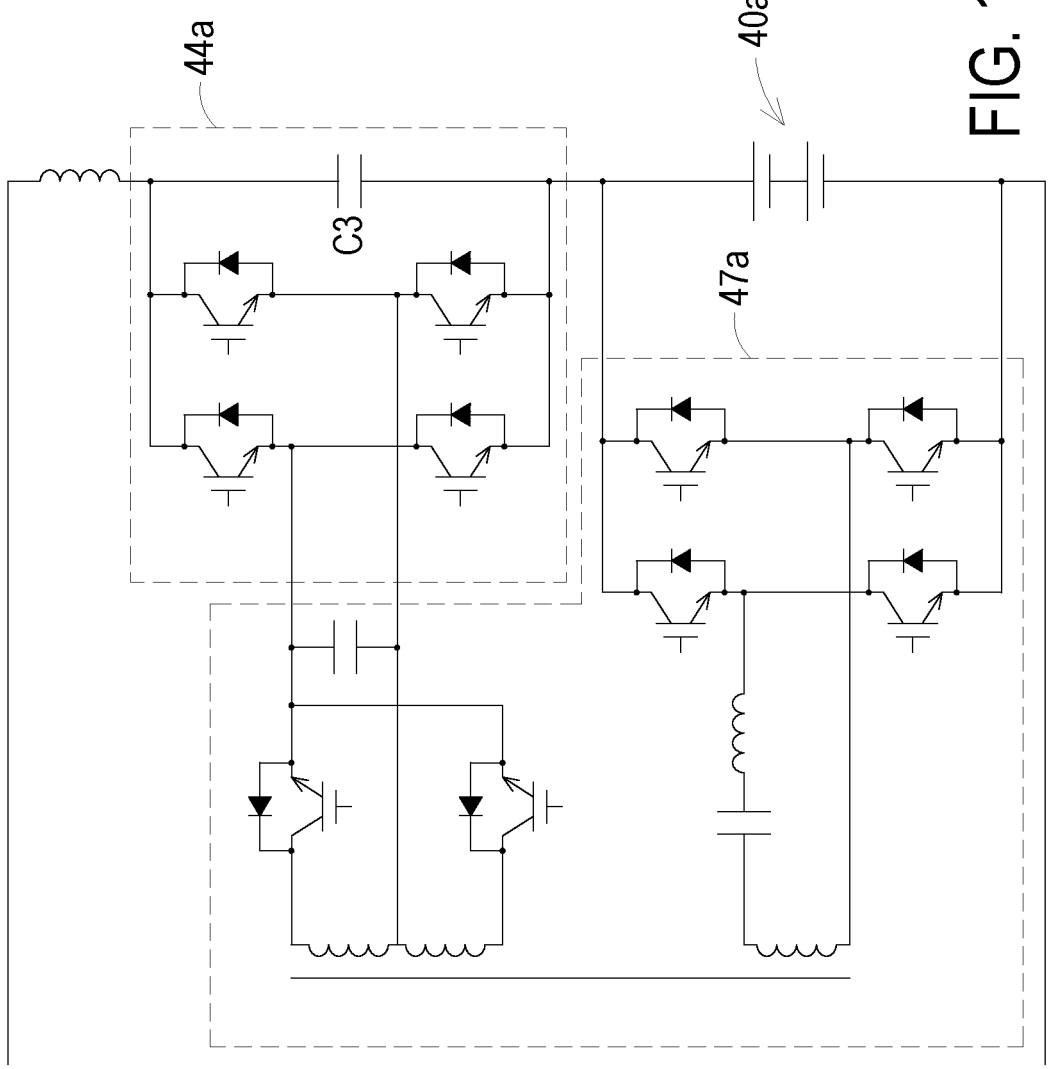

In the example of FIG. 15K, the converter includes a full-bridge circuit 44a and an LLC converter 47a. The energy storage battery pack 40a is electrically connected with the input side of the converter in parallel. An output side capacitor C3 of the converter is electrically connected with the energy storage battery pack 40a in series.

From the above descriptions, the present disclosure provides an electrical system and a supporting device of the electrical system. The power units of the electrical system are electrically connected with each other in series. Even if the number of the boost transformers in the electrical system is decreased, the voltage can be increased. Consequently, the number of transformation links is reduced, the power transmission efficiency of the electrical system is enhanced, and the installation cost of the electrical system is reduced. Moreover, the power unit is disposed on the conductive part of the supporting device. The conductive part of each supporting device is electrically connected with the power terminal of the power unit, or electrically connected with a reference potential of the electrical system. The support part is connected between the conductive part and the ground potential. In other words, the voltage stress is created in the region between the conductive part and the ground potential. Consequently, the insulation requirement of the power unit is reduced. Moreover, since the difficulty of designing the insulation structure between the conductive part and the ground potential is low, the voltage level of the electrical system can be raised to a higher level or even up to the transmission voltage level. Moreover, since the conductive part is electrically connected with the power terminal of the power unit or the reference potential of the electrical system, the conductive part has a function similar to the Faraday cage. That is, the conductive part is in a low electric field area. Consequently, the current-carrying maintenance for the power unit can be performed easily.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An electrical system comprising:
   a first conduction terminal;
   a second conduction terminal;

N power units electrically connected between the first conduction terminal and the second conduction terminal in series, wherein N is an integer greater than or equal to 2; and N supporting devices, wherein each of the N supporting devices comprises a conductive part and a support part, and each of the N power units is disposed on the corresponding conductive part, wherein the conductive part is electrically connected with a power terminal of one of the N power units or electrically connected with a reference potential of the electrical system, and the support part is connected between the corresponding conductive part and a ground potential.

2. The electrical system according to claim 1, wherein a first voltage stress is formed between the conductive part and the corresponding power unit, and a second voltage stress is formed between the conductive part and the ground potential, wherein an insulation structure of the power unit is provided to insulate the first voltage stress, and the support part is provided to insulate the second voltage stress.

3. The electrical system according to claim 2, wherein the first voltage stress is lower than or equal to the second voltage stress.

4. The electrical system according to claim 1, wherein the conductive part is electrically connected with the power terminal of the corresponding power unit, or the conductive part is electrically connected with the power terminal of the power unit adjacent to the corresponding power unit and
   wherein the power terminal is a DC terminal or an AC terminal, and the reference potential is a DC potential or an AC potential.

5. The electrical system according to claim 1, wherein the supporting device comprises an insulation segment, and the insulation segment is arranged between the conductive part and the ground potential, wherein the conductive part and the ground potential are isolated from each other through the insulation segment.

6. The electrical system according to claim 1, wherein the electrical system further comprises N voltage limiters, and each of the N voltage limiters is connected between the conductive part of the corresponding supporting device and the ground potential, wherein when a voltage at the conductive part is higher than a threshold voltage, the corresponding voltage limiter is switched from an off state to an on state, so that electric energy on the conductive part is guided to a ground.

7. The electrical system according to claim 5, wherein the support part further comprises a non-insulation segment, and the non-insulation segment is connected between the insulation segment and the ground.

8. The electrical system according to claim 5, wherein the electrical system further comprises 2N shielded cables and 2N stress cones, wherein the N power units are electrically connected with each other in series through the 2N shielded cables, each of the N power units is connected with two of the 2N shielded cables, and an outer surface of each of the 2N shielded cables is provided with a cable insulating layer, a stress layer and a shielding layer sequentially, wherein the cable insulating layer is located beside the corresponding conductive part, the shielding layer is located away from the corresponding conductive part, the stress layer is arranged between the cable insulating layer and the shielding layer, and each of the 2N stress cones is disposed in the stress layer of the corresponding shielded cable.

9. The electrical system according to claim 1, wherein the electrical system is a wind power generation system, each of the N power units comprises at least one wind power generator and at least one converter, and each converter comprises an input terminal, an output positive terminal and an output negative terminal, wherein the input terminal of the converter is electrically connected with the corresponding wind power generator, the output positive terminal of the converter in the first power unit of the N power units is electrically connected with the first conduction terminal, the output negative terminal of the converter in an N-th power unit of the N power units is electrically connected with the second conduction terminal, and the output negative terminal of the converter in an i-th power unit of the N power units is electrically connected with the output positive terminal of the converter in an (i+1)-th power unit of the N power units, wherein i is an integer smaller than or equal to (N−1).

10. The electrical system according to claim 1, wherein the electrical system is an energy storage system, each of the N power units comprises an energy storage battery pack and a converter, and each converter comprises an energy storage terminal, a positive conduction terminal and a negative conduction terminal, wherein the energy storage terminal of the converter in each power unit is electrically connected with the corresponding energy storage battery pack, the positive conduction terminal of the converter in a first power unit of the N power units is electrically connected with the first conduction terminal, the negative conduction terminal of the converter in an N-th power unit of the N power units is electrically connected with the second conduction terminal, and the negative conduction terminal of the converter in an i-th power unit of the N power units is electrically connected with the positive conduction terminal of the converter in an (i+1)-th power unit of the N power units, wherein i is an integer smaller than or equal to (N−1).

11. The electrical system according to claim 1, wherein the electrical system is an energy storage system, each of the N power units comprises M energy storage battery packs and M converters, and each converter comprises an energy storage terminal, a positive conduction terminal and a negative conduction terminal, wherein the energy storage terminal of the converter in each power unit is electrically connected with the corresponding energy storage battery pack, the positive conduction terminals of the M converters in each power unit are electrically connected with a first node, the negative conduction terminals of the M converters in each power unit are electrically connected with a second node, the first node of a first power unit of the N power units is electrically connected with the first conduction terminal, the second node of an N-th power unit of the N power units is electrically connected with the second conduction terminal, and the second node of an i-th power unit of the N power units is electrically connected with the first node of an (i+1)-th power unit of the N power units, wherein i is an integer smaller than or equal to (N−1), and M is an integer greater than or equal to 2.

12. The electrical system according to claim 1, wherein the electrical system is an energy storage system, each of the N power units comprises M energy storage battery packs and M converters, and each converter comprises an energy storage terminal, a positive conduction terminal and a negative conduction terminal, wherein the energy storage terminal of the converter in each power unit is electrically connected with the corresponding energy storage battery pack, the positive conduction terminals of the M converters in a first power unit of the N power units are connected with each other and connected with the first conduction terminal, the negative conduction terminals of the M converters in an N-th power unit of the N power units are connected with each other and connected with the second conduction terminal, and the negative conduction terminal of a j-th converter in an i-th power unit of the N power units is electrically connected with the positive conduction terminal of a j-th converter in an (i+1)-th power unit of the N power units, wherein the j-th converter in one of the N power units is at the same potential as the j-th converter in the other of the N power units, wherein i is an integer smaller than or equal to (N−1), j is an integer greater than or equal to 1, and M is an integer greater than or equal to j.

13. The electrical system according to claim 1, wherein the electrical system is a three-phase energy storage system, the electrical system further comprises a third conduction terminal, and the electrical system comprises a first power unit, a second power unit and a third power unit, wherein each of the first power unit, the second power unit and the third power unit comprises M energy storage battery packs and M converters, and each converter comprises an energy storage terminal, a positive conduction terminal and a negative conduction terminal, wherein the energy storage terminal of the converter in each power unit is electrically connected with the corresponding energy storage battery pack, the positive conduction terminal of a first converter of the M converters in the first power unit is electrically connected with the first conduction terminal, the positive conduction terminal of a first converter of the M converters in the second power unit is electrically connected with the second conduction terminal, the positive conduction terminal of a first converter of the M converters in the third power unit is electrically connected with the third conduction terminal, the negative conduction terminal of an M-th converter of the M converters in the first power unit, the negative conduction terminal of an M-th converter of the M converters in the second power unit and the negative conduction terminal of an M-th converter of the M converters in the third power unit are electrically connected with each other, wherein in each of the first power unit, the second power unit and the third power unit, the negative conduction terminal of a j-th converter is electrically connected with the positive conduction terminal of a (j+1)-th converter, wherein M is an integer greater than or equal to 2, and j is an integer smaller than or equal to (M−1).

14. The electrical system according to claim 1, wherein the electrical system is a data center system, the electrical system comprises N power units, each of the N power units comprises M loads, and each of the M loads comprises an input positive terminal and an input negative terminal, wherein the input positive terminal of a first load of the M loads in a first power unit of the N power units is electrically connected with the first conduction terminal, and the input negative terminal of an M-th load of the M loads in an N-th power unit of the N power units is electrically connected with the second conduction terminal, wherein in each of the N power units, the input negative terminal of a j-th load is electrically connected with the input positive terminal of a (j+1)-th load, wherein in the N power units, the input negative terminal of an M-th load in the i-th power unit is electrically connected with the input positive terminal of a first load in a (i+1)-th power unit, wherein M is an integer greater than or equal to 2, j is an integer smaller than or equal to (M−1), and i is an integer smaller than or equal to (N−1).

15. The electrical system according to claim 1, wherein the electrical system is a data center system, each of the N power units comprises M loads, and each of the M loads comprises an input positive terminal and an input negative terminal, wherein the input positive terminals of the M loads in a first power unit of the N power units are electrically connected with each other and connected with the first conduction terminal, and the input negative terminals of the M loads in an N-th power unit of the N power units are electrically connected with each other and connected with the second conduction terminal, wherein in the N power units, the negative conduction terminal of a j-th load in an i-th power unit is electrically connected with the positive conduction terminal of a j-th load in an (i+1)-th power unit, wherein the j-th load in one of the N power units is at the same potential as the j-th load in the other of the N power units, wherein M is an integer greater than or equal to 2, j is an integer smaller than or equal to (M−1), and i is an integer smaller than or equal to (N−1).

16. An electrical system comprising:
a first conduction terminal;
a second conduction terminal;
a power unit electrically connected between the first conduction terminal and the second conduction terminal; and
a supporting device comprising a conductive part and a support part, wherein the power unit is disposed on the conductive part, the conductive part is electrically connected with a power terminal of the power unit or electrically connected with a reference potential of the electrical system, and the support part is connected between the conductive part and a ground potential.

17. The electrical system according to claim 16, wherein the electrical system is an energy storage system, the power unit comprises M energy storage battery packs and M converters, and each converter comprises an energy storage terminal, a positive conduction terminal and a negative conduction terminal, wherein the energy storage terminal of each converter in the power unit is electrically connected with the corresponding energy storage battery pack, the positive conduction terminal of a first converter of the M converters is electrically connected with the first conduction terminal, the negative conduction terminal of an M-th converter of the M converter is electrically connected with the second conduction terminal, and the negative conduction terminal of an i-th converter of the M converters is electrically connected with the positive conduction terminal of an (i+1)-th converter of the M converters, wherein M is an integer greater than or equal to 2, and i is an integer smaller than or equal to (M−1).

18. The electrical system according to claim 16, wherein the electrical system is a data center system, the power unit comprises M loads, and each of the M loads comprises an input positive terminal and an input negative terminal, wherein the input positive terminal of a first load of the M loads is electrically connected with the first conduction terminal, the input negative terminal of an M-th load of the M loads is electrically connected with the second conduction terminal, and the input negative terminal of an i-th load of the M loads is electrically connected with the input positive terminal of an (i+1)-th load of the M loads, wherein M is an integer greater than or equal to 2, and i is an integer smaller than or equal to (M−1).

19. A supporting device for an electrical system, the electrical system comprising a first conduction terminal, a second conduction terminal and at least one power unit, the at least one power unit being electrically connected between the first conduction terminal and the second conduction terminal, the supporting device comprising:
a conductive part, wherein one of the at least one power unit is disposed on the conductive part, and the conductive part is electrically connected with a power terminal of one of the at least one power unit or electrically connected with a reference potential of the electrical system; and a support part connected between the conductive part and a ground potential.

20. The supporting device according to claim 19, wherein the conductive part is a closed frame, an unclosed frame or a plate type structure.

* * * * *